US012783148B2

(12) United States Patent
Hayashi

(10) Patent No.: US 12,783,148 B2
(45) Date of Patent: Nov. 3, 2026

(54) DETERMINING ACCESS INCREASE RATE TO A STORAGE VOLUME FOR MULTIPLE SERVERS

(71) Applicant: Hitachi Vantara, Ltd., Yokohama (JP)

(72) Inventor: Shinichi Hayashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/811,936

(22) Filed: Aug. 22, 2024

(65) Prior Publication Data

US 2025/0156105 A1 May 15, 2025

(30) Foreign Application Priority Data

Nov. 15, 2023 (JP) ................................ 2023-194449

(51) Int. Cl.
*G06F 3/06* (2006.01)

(52) U.S. Cl.
CPC ........... *G06F 3/065* (2013.01); *G06F 3/0604* (2013.01); *G06F 3/067* (2013.01)

(58) Field of Classification Search
None
See application file for complete search history.

(56) References Cited

U.S. PATENT DOCUMENTS 9,535,612 B2 * 1/2017 Best ..................... G06F 3/0653
9,716,617 B1 7/2017 Ahuja et al.
12,112,075 B1 * 10/2024 Krivenok ................ G06F 3/067
2011/0082988 A1 4/2011 Kono et al.
2017/0091032 A1 * 3/2017 Peake ................ G06F 11/1092
2020/0018509 A1 1/2020 Nagahara et al.
2020/0409584 A1 * 12/2020 Matsumoto ............. G06F 3/061
(Continued)

FOREIGN PATENT DOCUMENTS

CN 112367324 A 2/2021
JP 2011-081467 A 4/2011
(Continued)

OTHER PUBLICATIONS

Japanese Office Action received in corresponding Japanese Application No. 2023-194449 dated Sep. 15, 2026.

*Primary Examiner* — Arpan P. Savla
*Assistant Examiner* — Edmund H Kwong
(74) *Attorney, Agent, or Firm* — MATTINGLY & MALUR, PC

(57) ABSTRACT

A management node manages an access load on a second storage that provides, to second servers, a second volume to which a first volume provided to first servers by a first storage is remotely copied, and a snapshot created from the second volume. Where the number of accesses to a storage device storing the second volume or throughput thereof exceeds a threshold, the management node calculates an increase rate of the number of accesses on the basis of first number of writes and first number of reads to/from the second volume for each of the first servers. In addition, the management node calculates an increase rate of the number of accesses on the basis of second number of writes and second number of reads to/from the second volume. Then, the management node specifies the first servers and the second servers in which the increase rate exceeds a threshold.

12 Claims, 18 Drawing Sheets

(56) References Cited

U.S. PATENT DOCUMENTS

| | | | | |
|---|---|---|---|---|
| 2021/0294497 | A1 | 9/2021 | Deguchi et al. | |
| 2022/0317883 | A1* | 10/2022 | Ramanan | G06F 3/067 |
| 2023/0359397 | A1* | 11/2023 | Li | G06F 3/0688 |

FOREIGN PATENT DOCUMENTS

| | | | |
|---|---|---|---|
| JP | 2019-523949 | A | 8/2019 |
| JP | 2021-149550 | A | 9/2021 |
| WO | 2018/182035 | A1 | 10/2018 |

* cited by examiner

| STORAGE IP ADDRESS 57 | STORAGE iSCSI NAME 58 |
|---|---|
| 10.0.0.1 | iqn.2006-04.com.example:1 |
| 10.0.0.2 | iqn.2006-04.com.example:2 |
| : | : |

FIG. 6

STORAGE CONFIGURATION INFORMATION
66

| STORAGE NODE ID (661) | DATA PROTECTION TYPE (662) | NODE SIZE (663) |
|---|---|---|
| SN24a | Mirror | m6i.8xlarge |
| SN24b | Mirror | m6i.8xlarge |
| SN24c | Mirror | m6i.8xlarge |
| : | : | : |

FIG. 7

VOLUME CONFIGURATION INFORMATION
67

| VOLUME ID (671) | STORAGE NODE ID (672) | DATA PROTECTION STORAGE NODE ID (673) | JOURNAL GROUP ID (674) | VOLUME TYPE (675) | SNAPSHOT SOURCE VOLUME (676) |
|---|---|---|---|---|---|
| S222 | SN24a | SN24c | JG203 | Regular | - |
| S223 | SN24a | SN24c | JG203 | Regular | - |
| S224 | SN24a | SN24c | JG203 | Regular | - |
| SS225 | SN24a | SN24c | - | Snapshot | S224 |
| SS226 | SN24a | SN24c | - | Snapshot | Sxxx |
| Sxxx | SN24b | SN24a | JGxxx | Regular | - |
| : | : | : | : | : | : |

FIG. 8

STORAGE DEVICE CONFIGURATION INFORMATION
68

| STORAGE NODE ID (681) | STORAGE DEVICE ID (682) |
|---|---|
| SN24a | SD1 |
| SN24a | SD2 |
| SN24a | SD3 |
| SN24b | SD1 |
| SN24b | SD2 |
| SN24b | SD3 |
| : | : |

FIG. 9

VOLUME PERFORMANCE INFORMATION
69

| STORAGE NODE ID (691) | VOLUME ID (692) | DATE AND TIME (693) | NUMBER OF READS (694) | NUMBER OF WRITES (695) | READ THROUGHPUT (696) | WRITE THROUGHPUT (697) |
|---|---|---|---|---|---|---|
| SN24a | S222 | 2023/1/1 0:00 | 0 | 300 | 0 | 3 |
| SN24a | S222 | 2023/1/1 0:05 | 0 | 323 | 0 | 3 |
| SN24a | S222 | 2023/1/1 0:10 | 0 | 321 | 0 | 3 |
| SN24a | S222 | 2023/1/1 0:15 | 0 | 309 | 0 | 3 |
| SN24a | S223 | 2023/1/1 0:00 | 0 | 300 | 0 | 3 |
| SN24a | S223 | 2023/1/1 0:05 | 0 | 323 | 0 | 3 |
| : | : | : | : | : | : | |

FIG. 10

STORAGE DEVICE PERFORMANCE INFORMATION
70

| STORAGE NODE ID (701) | STORAGE DEVICE ID (702) | DATE AND TIME (703) | NUMBER OF READS (704) | NUMBER OF WRITES (705) | READ THROUGHPUT (706) | WRITE THROUGHPUT (707) |
|---|---|---|---|---|---|---|
| SN24a | SD1 | 2023/1/1 0:00 | 2090 | 4090 | 2 | 4 |
| SN24a | SD1 | 2023/1/1 0:05 | 2234 | 4234 | 2 | 4 |
| SN24a | SD1 | 2023/1/1 0:10 | 2432 | 4432 | 2 | 4 |
| SN24a | SD1 | 2023/1/1 0:15 | 2222 | 4222 | 2 | 4 |
| ⋮ | ⋮ | ⋮ | ⋮ | ⋮ | ⋮ | ⋮ |

FIG. 11

REMOTE COPY CONFIGURATION INFORMATION
72

| STORAGE ID (721) | VOLUME ID (722) | STORAGE NODE ID (723) | VOLUME ID (724) |
|---|---|---|---|
| Storage13 | P211 | SN24a | S222 |
| Storage13 | P212 | SN24a | S223 |
| Storage13 | P213 | SN24a | S224 |
| ⋮ | ⋮ | ⋮ | ⋮ |

FIG. 13

DB CONFIGURATION INFORMATION
89

| DB NODE ID (891) | STORAGE NODE ID (893) | VOLUME ID (894) |
|---|---|---|
| DB11a | SN24a | P212 |
| DB11a | SN24a | P213 |
| DB11b | SN24a | P212 |
| : | : | : |

FIG. 14

COPY SERVER CONFIGURATION INFORMATION
90

| COPY NODE ID (901) | STORAGE NODE ID (902) | VOLUME ID (903) |
|---|---|---|
| CN25a | SN24a | SS226 |
| CN25b | SN24a | SS225 |
| : | : | : |

FIG.15

VOLUME GROUP CONFIGURATION INFORMATION
91

| VOLUME GROUP ID (911) | VOLUME ID (912) | COMPUTE TYPE (913) | COMPUTE ID (914) |
|---|---|---|---|
| VG1 | J221 | - | - |
| VG1 | S222 | DB | DB11b |
| VG1 | S223 | DB | DB11a |
| VG1 | S224 | DB | DB11a |
| VG1 | SS225 | COPY | CN25b |
| VG2 | SS226 | COPY | CN25a |
| : | : | : | : |

FIG.16

VOLUME GROUP PERFORMANCE INFORMATION
92

| VOLUME GROUP ID (921) | DATE AND TIME (922) | NUMBER OF ACCESSES (923) | THROUGHPUT (924) |
|---|---|---|---|
| VG1 | 2023/1/1 0:00 | 1010 | 8 |
| VG1 | 2023/1/1 0:05 | 1120 | 9 |
| VG1 | 2023/1/1 0:10 | 1104 | 9 |
| VG1 | 2023/1/1 0:15 | 1034 | 8 |
| VG2 | 2023/1/1 0:00 | 100 | 400 |
| VG2 | 2023/1/1 0:05 | 123 | 444 |
| : | : | : | : |

FIG. 19

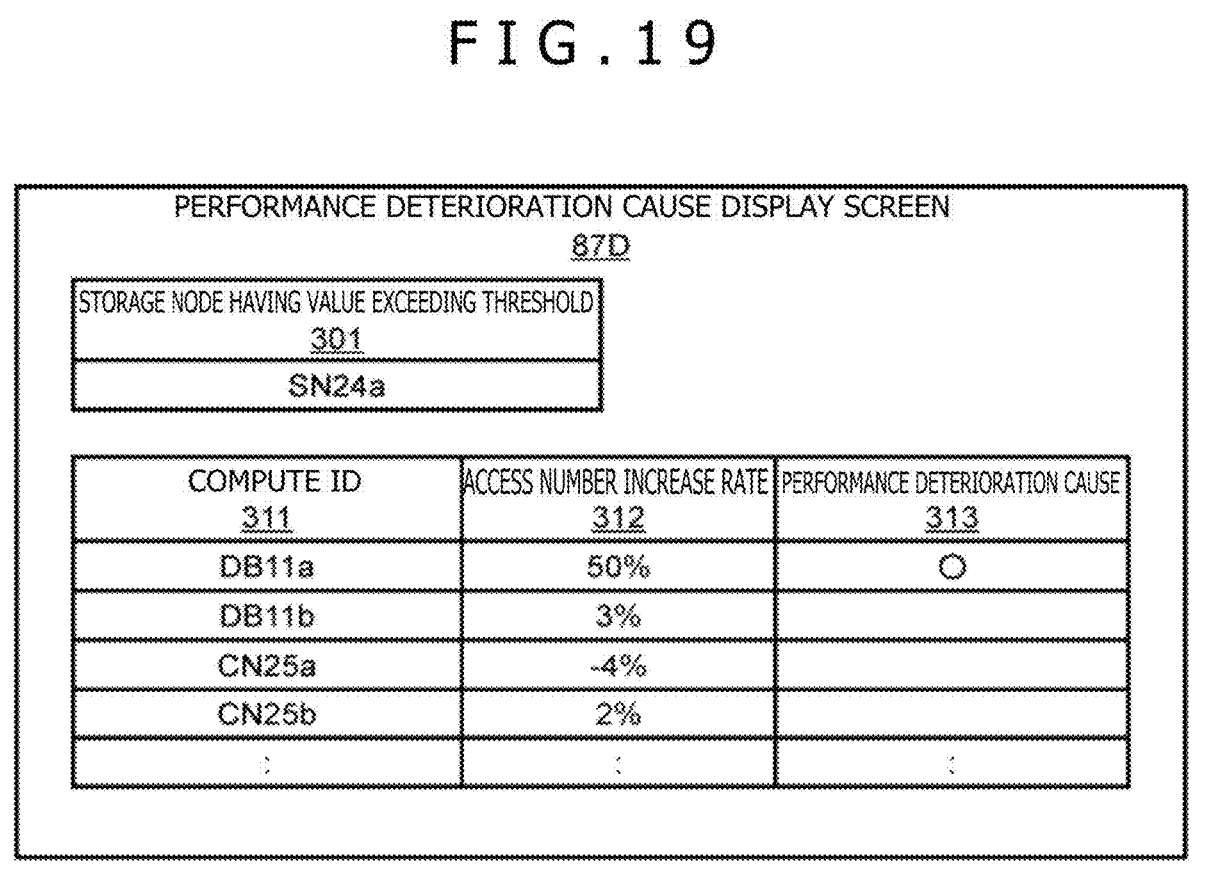

PERFORMANCE DETERIORATION CAUSE DISPLAY SCREEN
87D

| STORAGE NODE HAVING VALUE EXCEEDING THRESHOLD 301 |
|---|
| SN24a |

| COMPUTE ID 311 | ACCESS NUMBER INCREASE RATE 312 | PERFORMANCE DETERIORATION CAUSE 313 |
|---|---|---|
| DB11a | 50% | ○ |
| DB11b | 3% | |
| CN25a | -4% | |
| CN25b | 2% | |
| ⋮ | ⋮ | ⋮ |

FIG. 21

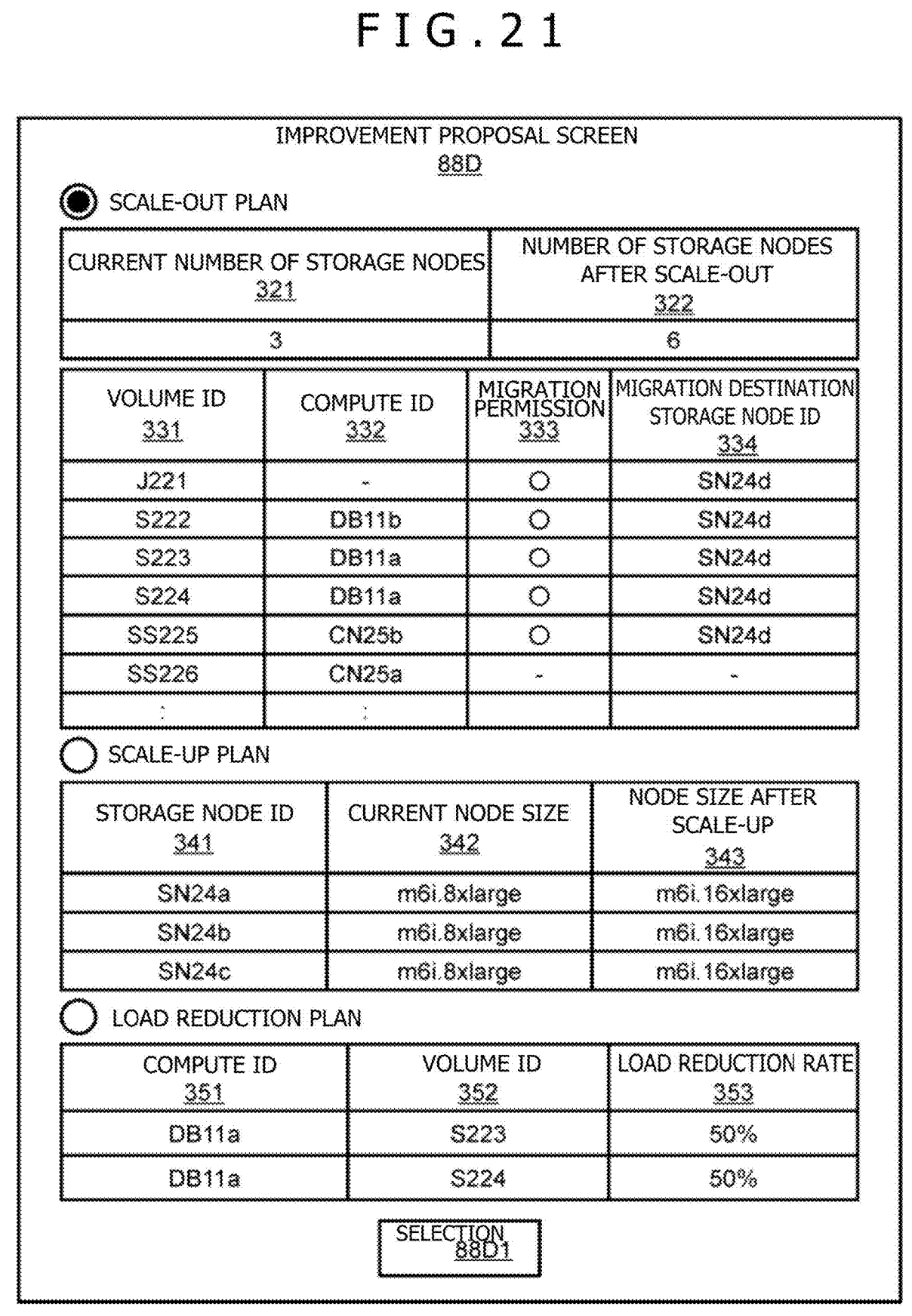

IMPROVEMENT PROPOSAL SCREEN
88D (●) SCALE-OUT PLAN

| CURRENT NUMBER OF STORAGE NODES 321 | NUMBER OF STORAGE NODES AFTER SCALE-OUT 322 |
|---|---|
| 3 | 6 |

| VOLUME ID 331 | COMPUTE ID 332 | MIGRATION PERMISSION 333 | MIGRATION DESTINATION STORAGE NODE ID 334 |
|---|---|---|---|
| J221 | - | ○ | SN24d |
| S222 | DB11b | ○ | SN24d |
| S223 | DB11a | ○ | SN24d |
| S224 | DB11a | ○ | SN24d |
| SS225 | CN25b | ○ | SN24d |
| SS226 | CN25a | - | - |
| ⋮ | ⋮ | | |

(○) SCALE-UP PLAN

| STORAGE NODE ID 341 | CURRENT NODE SIZE 342 | NODE SIZE AFTER SCALE-UP 343 |
|---|---|---|
| SN24a | m6i.8xlarge | m6i.16xlarge |
| SN24b | m6i.8xlarge | m6i.16xlarge |
| SN24c | m6i.8xlarge | m6i.16xlarge |

(○) LOAD REDUCTION PLAN

| COMPUTE ID 351 | VOLUME ID 352 | LOAD REDUCTION RATE 353 |
|---|---|---|
| DB11a | S223 | 50% |
| DB11a | S224 | 50% |

[SELECTION 88D1]

FIG. 23

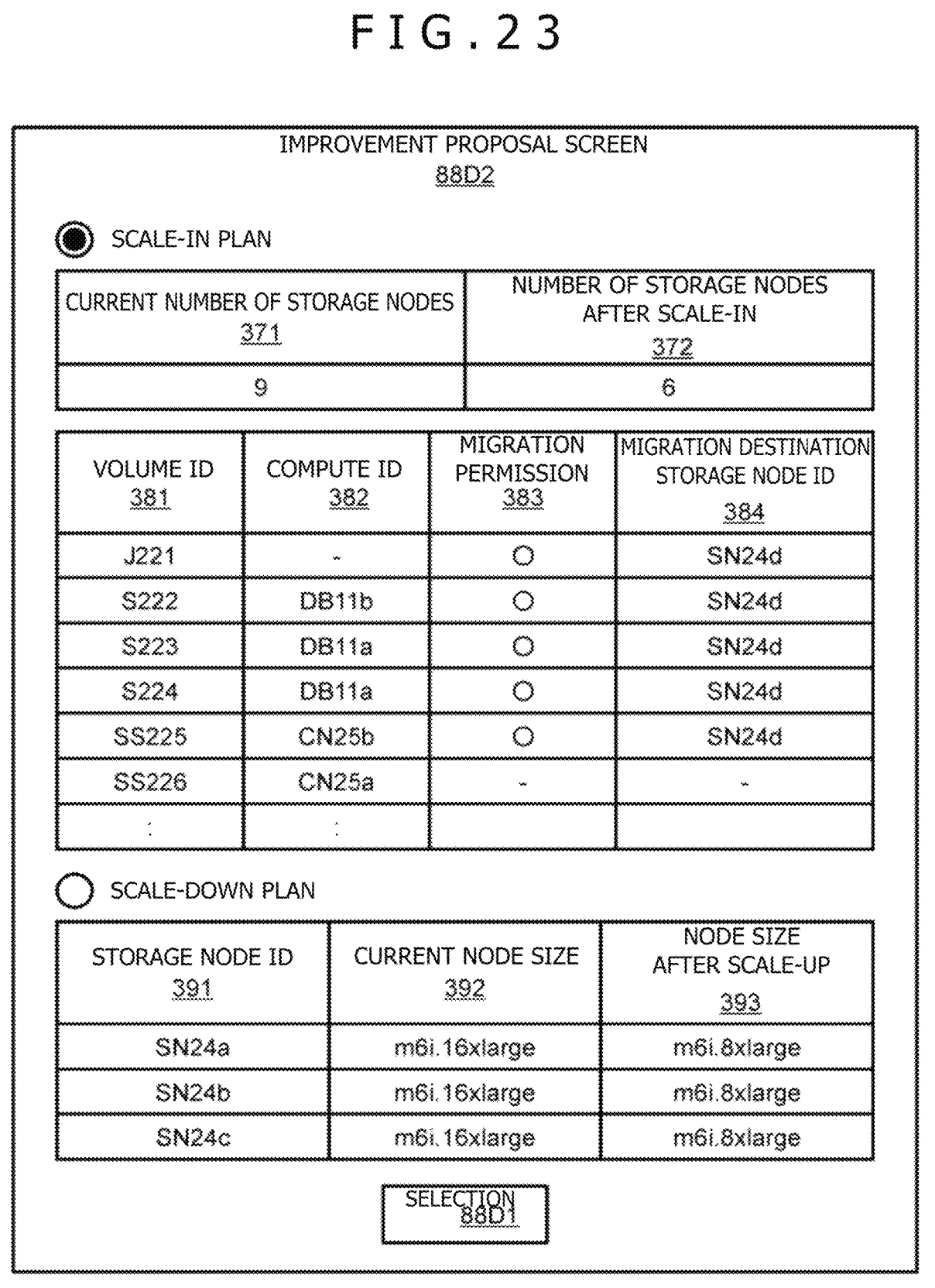

IMPROVEMENT PROPOSAL SCREEN
88D2

◉ SCALE-IN PLAN

| CURRENT NUMBER OF STORAGE NODES 371 | NUMBER OF STORAGE NODES AFTER SCALE-IN 372 |
|---|---|
| 9 | 6 |

| VOLUME ID 381 | COMPUTE ID 382 | MIGRATION PERMISSION 383 | MIGRATION DESTINATION STORAGE NODE ID 384 |
|---|---|---|---|
| J221 | - | O | SN24d |
| S222 | DB11b | O | SN24d |
| S223 | DB11a | O | SN24d |
| S224 | DB11a | O | SN24d |
| SS225 | CN25b | O | SN24d |
| SS226 | CN25a | - | - |
| : | : | | |

○ SCALE-DOWN PLAN

| STORAGE NODE ID 391 | CURRENT NODE SIZE 392 | NODE SIZE AFTER SCALE-UP 393 |
|---|---|---|
| SN24a | m6i.16xlarge | m6i.8xlarge |
| SN24b | m6i.16xlarge | m6i.8xlarge |
| SN24c | m6i.16xlarge | m6i.8xlarge |

SELECTION
88D1

DETERMINING ACCESS INCREASE RATE TO A STORAGE VOLUME FOR MULTIPLE SERVERS

CROSS-REFERENCE TO RELATED APPLICATION

The present application claims priority from Japanese application JP2023-194449, filed on Nov. 15, 2023, the content of which is hereby incorporated by reference into this application.

BACKGROUND OF THE INVENTION

1. Field of the Invention

The present invention relates to a management apparatus and a management method for a storage system.

2. Description of the Related Art

There has been known a technique called disaster recovery (DR) for copying data to a remote secondary site and holding the copy data in preparation for data loss at a primary site in the case where a large-scale disaster such as an earthquake or a fire occurs.

In addition, in recent years, the DR that has been performed between on-premise sites is performed between an on-premise site and a cloud. Here, in the cloud, resources can be used as much as needed when needed, so that secondary use of data copied to the cloud, such as analysis on the cloud side, is enabled.

In this regard, for example, JP-2011-81467-A discloses a computer system that can perform migration control based on user requirements by controlling a related source volume and a related destination volume together for a pair of related volumes or a group thereof.

SUMMARY OF THE INVENTION

However, in the conventional technique described above, an access load on a storage when the data copied to the storage of the cloud site is secondarily used on the cloud site side is not considered.

The present invention has been made in consideration of the above circumstances, and an object of the present invention is to consider an access load at the time when data copied to another storage is secondarily used on the other storage side.

According to an aspect of the present invention, provided is a management apparatus of a storage system for managing an access load on a second storage that provides, to second servers, a second volume to which a first volume provided to first servers by a first storage is remotely copied, and a snapshot created from the second volume, the management apparatus having a processor and a memory. In the management apparatus, the processor monitors the number of accesses to a storage device storing the second volume or throughput thereof, and when the number of accesses or the throughput exceeds a threshold, calculates the first number of accesses to the storage device for each of the first servers on the basis of the first number of writes and the first number of reads to/from the second volume for each of the first servers, calculates the second number of accesses to the storage device for each of the second servers on the basis of the second number of writes and the second number of reads to/from the second volume for each of the second servers, calculates an increase rate of the first number of accesses for each of the first servers and an increase rate of the second number of accesses for each of the second servers, specifies the first servers and the second servers in which the increase rate exceeds a threshold, and displays information related to the specified first servers and second servers on a display unit.

According to the present invention, it is possible to take into consideration an access load when data copied to another storage is secondarily used on the other storage side. Therefore, it is possible to suppress the deterioration of processing performance due to resource shortage in another storage caused by an access load when the copy data is secondarily used on the other storage side.

BRIEF DESCRIPTION OF THE DRAWINGS

FIG. 6 is a diagram for depicting an example of a configuration of storage configuration information according to the first embodiment;

FIG. 7 is a diagram for depicting an example of a configuration of volume configuration information according to the first embodiment;

FIG. 8 is a diagram for depicting an example of a configuration of storage device configuration information according to the first embodiment;

FIG. 9 is a diagram for depicting an example of a configuration of volume performance information according to the first embodiment;

FIG. 10 is a diagram for depicting an example of a configuration of storage device performance information according to the first embodiment;

FIG. 11 is a diagram for depicting an example of a configuration of remote copy configuration information according to the first embodiment;

FIG. 13 is a diagram for depicting an example of a configuration of DB configuration information according to the first embodiment;

FIG. 14 is a diagram for depicting an example of a configuration of copy server configuration information according to the first embodiment;

FIG. 15 is a diagram for depicting an example of a configuration of volume group configuration information according to the first embodiment;

FIG. 16 is a diagram for depicting an example of a configuration of volume group performance information according to the first embodiment;

FIG. 19 is a diagram for depicting an example of a configuration of a performance deterioration cause display screen according to the first embodiment;

FIG. 21 is a diagram for depicting an example of a configuration of an improvement proposal screen (at the time of overload) according to the first embodiment;

FIG. 23 is a diagram for depicting an example of a configuration of an improvement proposal screen (at the time of reducing storage node) according to the second embodiment.

DETAILED DESCRIPTION OF THE PREFERRED EMBODIMENTS

Figure 1:
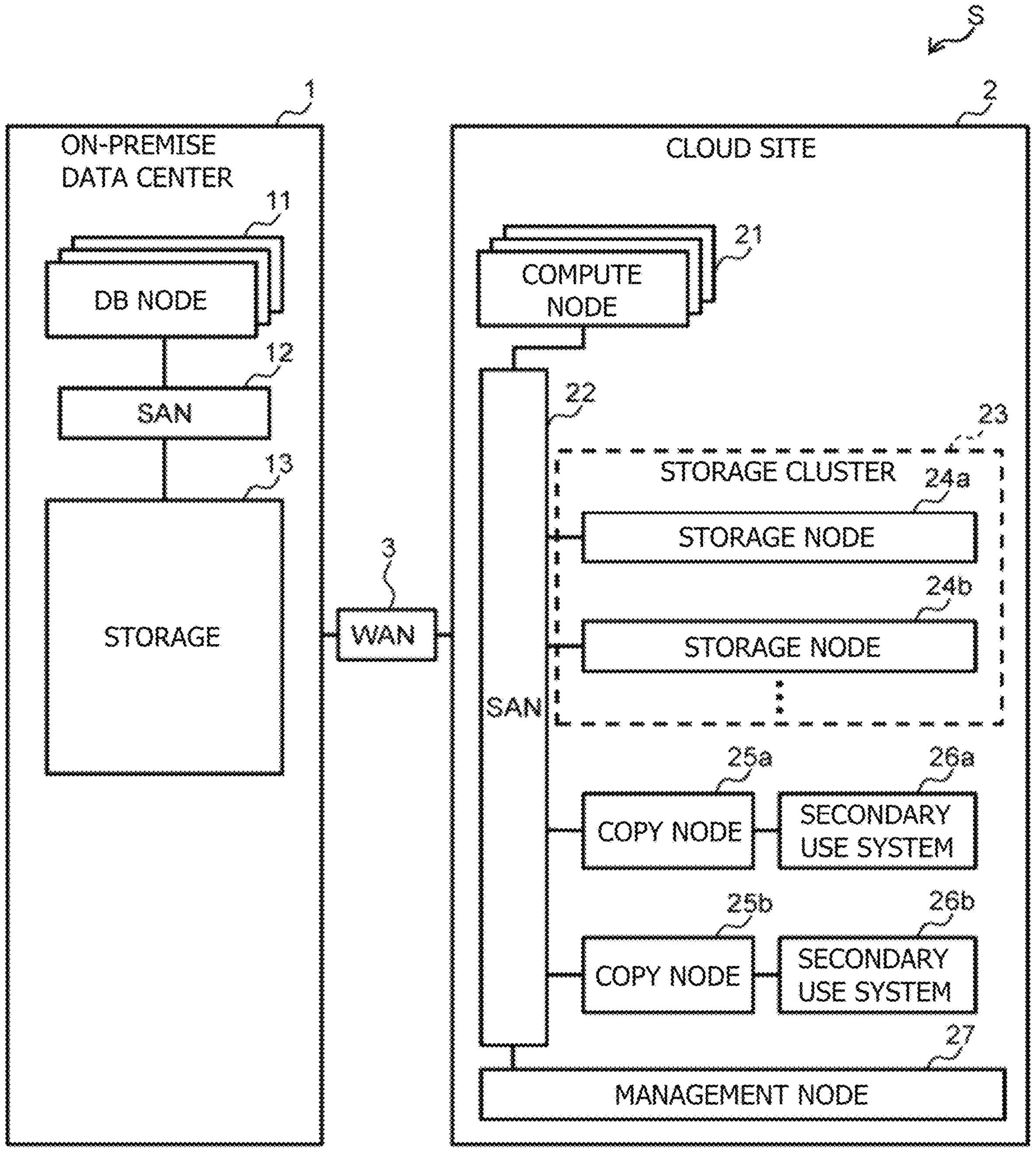
FIG. 1 is a diagram for depicting an example of a configuration of a whole system according to a first embodiment.

In the following description, an "interface apparatus" may be one or more interface devices. The one or more interface devices may be at least one of the followings.

One or More Input/Output (I/O) Interface Devices

The I/O interface device is an interface device for at least one of an I/O device and a remote display computer. The I/O interface device for the display computer may be a communication interface device. The at least one I/O device may be a user interface device, for example, either an input device such as a keyboard and a pointing device or an output device such as a display device.

One or More Communication Interface Devices

The one or more communication interface devices may be one or more communication interface devices of the same type (for example, one or more network interface cards (NICs) or two or more communication interface devices of different types (for example, an NIC and a host bus adapter (HBA).

In addition, in the following description, a "memory" is one or more memory devices that are examples of one or more storage devices, and may typically be a main storage device. The at least one memory device in the memory may be a volatile memory device or a non-volatile memory device.

In addition, in the following description, a "storage device" may be one or more permanent storage devices that are examples of one or more storage devices. The permanent storage device may typically be a non-volatile storage device (for example, an auxiliary storage device), and may specifically be, for example, a hard disk drive (HDD), a solid state drive (SSD), a non-volatile memory express (NVME) drive, or a storage class memory (SCM).

In addition, in the following description, a "central processing unit (CPU)" is an example of one or more processor devices. The at least one processor device is not typically limited to the CPU, but may be another type of processor device such as a graphics processing unit (GPU). The at least one processor device may be of a single-core or multi-core. The at least one processor device may be of a processor core.

The at least one processor device may be a circuit that is an assembly of gate arrays in a hardware description language by which some or all of processing are performed. The circuit is, for example, a processor device in a broad sense such as a field-programmable gate array (FPGA), a complex programmable logic device (CPLD), or an application specific integrated circuit (ASIC).

In addition, in the following description, a function will be described by an expression of "yyy function unit" in some cases. The function may be realized such that one or more computer programs are executed by a processor, may be realized by one or more hardware circuits (for example, an FPGA or an ASIC), or may be realized by a combination thereof.

In the case where the function is realized such that the program is executed by the processor, the function may be at least a part of the processor because the defined processing is performed by appropriately using a storage apparatus and/or an interface apparatus. The processing described with a function unit as a subject may be processing performed by a processor or an apparatus having the processor.

The program may be installed from a program source. The program source may be, for example, a program distribution computer or a computer-readable recording medium (for example, a non-temporary recording medium). The description of each function is only an example, and a plurality of functions may be combined into one function or one function may be divided into a plurality of functions. The "yyy function unit" may also be referred to as an "yyy unit."

In addition, in the following description, a "volume" (VOL) refers to a storage area of a storage, which may be implemented by a physical storage device or a logical storage device. In addition, the VOL may be a substantial VOL or a virtual VOL (VVOL). A snapshot VOL may be a VOL as a snapshot of a VOL.

In addition, in the following description, in the case where elements of the same type are described without distinguishing them from each other, common signs among reference signs are used, and in the case where elements of the same type are described by distinguishing them from each other, reference signs are used in some cases.

First Embodiment

FIG. 1 is a diagram for depicting an example of a configuration of a whole system S according to a first embodiment. The whole system S is configured such that an on-premise data center 1 and a cloud site 2 are connected to each other via a wide area network (WAN).

The on-premise data center 1 is a data center in which an on-premise environment is installed. An on-premise data base (DB) node 11 and a storage 13 connected to each other via a storage area network (SAN) 12 are arranged in the on-premise data center 1.

The cloud site 2 is a site in which a cloud environment is constructed. The cloud site 2 has a compute node 21, a storage cluster 23, copy nodes 25*a* and 25*b*, and a management node 27 that are connected to each other via a SAN 22.

The compute node 21 is a server that executes various types of processing, and inputs and outputs data to/from a storage node 24 included in the storage cluster 23 at the time of processing.

The storage cluster 23 includes a plurality of storage nodes 24*a*, 24*b*, and the like.

The copy nodes 25*a* and 25*b* are servers where secondary use systems 26*a* and 26*b* that secondarily use data remotely copied from the storage 13 of the on-premise data center 1 to the cloud site 2 are operated. The secondary use systems 26*a* and 26*b* are analysis systems for analyzing data, test environments of a system for conducting a test using data, and the like. In the present embodiment, the compute node 21 and the copy nodes 25*a* and 25*b* are separated for convenience, but the copy nodes 25*a* and 25*b* may be included in the compute node 21.

Details of the management node 27 will be described later with reference to FIG. 12.

(Configuration of DB Node 11)

Figure 2:
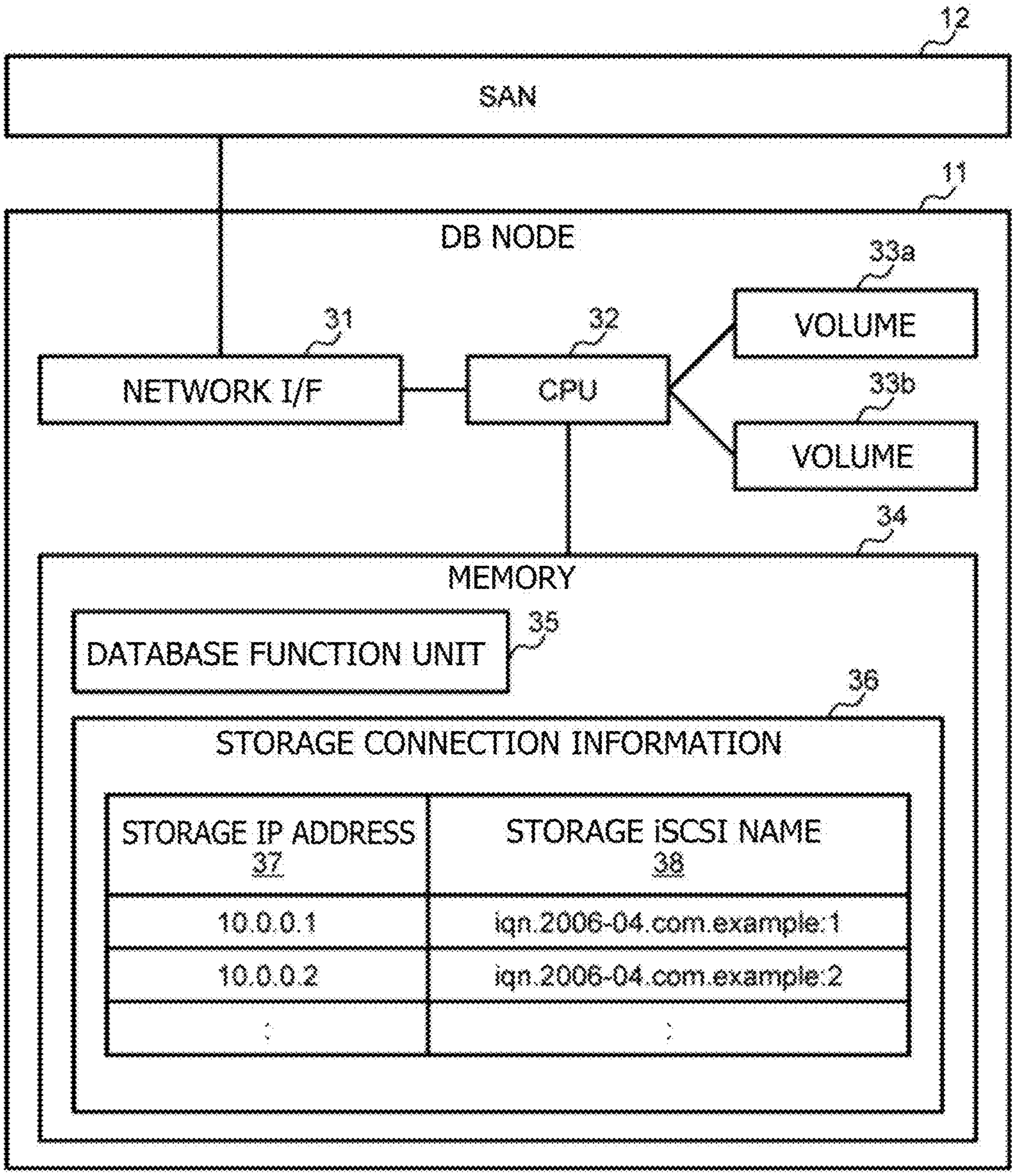
FIG. 2 is a diagram for depicting an example of a configuration of a DB node according to the first embodiment.

FIG. 2 is a diagram for depicting an example of a configuration of the DB node 11 according to the first embodiment. The DB node 11 is an example of a computer node (server) arranged in the on-premise data center 1. The DB node 11 has a network I/F 31, a CPU 32, volumes 33*a* and 33*b*, and a memory 34. The memory 34 stores a database function unit 35 and storage connection information 36.

The network I/F 31 is an interface used for the DB node 11 to communicate with the storage 13 (FIG. 1) via the SAN 12.

The CPU 32 entirely controls the DB node 11 and executes a predetermined program to realize the database function unit 35. The volumes 33*a* and 33*b* are storage areas provided to the DB node 11 by the storage 13.

The storage connection information 36 has columns of a storage IP address 37 and a storage iSCSI name 38. The database function unit 35 connects to the storage 13 on the basis of the storage connection information 36 and realizes data access.

(Configuration of Storage 13)

Figure 3:
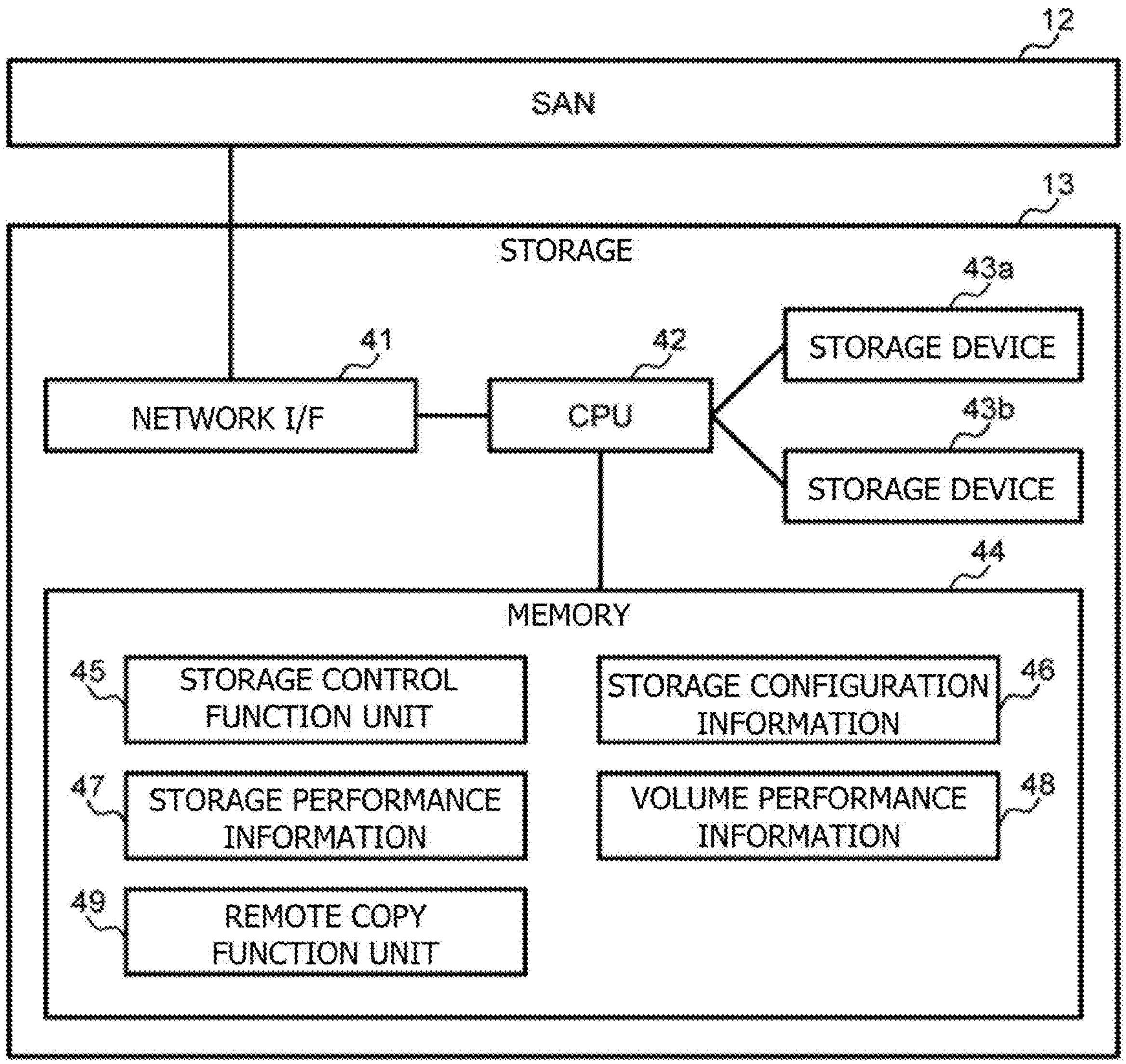
FIG. 3 is a diagram for depicting an example of a configuration of a storage according to the first embodiment.

FIG. 3 is a diagram for depicting an example of a configuration of the storage 13 according to the first embodiment. The storage 13 has a network I/F 41, a CPU 42, storage devices 43*a* and 43*b*, and a memory 44. The memory 44 stores a storage control function unit 45, storage configuration information 46, storage performance information 47, volume performance information 48, and a remote copy function unit 49.

The network I/F 41 is an interface used for the storage 13 to communicate with the DB node 11 via the SAN 12.

The CPU 42 entirely controls the storage 13 and executes a predetermined program to realize the storage control function unit 45 and the remote copy function unit 49.

The storage configuration information 46 is configuration information of the storage 13. The storage performance information 47 is performance information such as the number of accesses and throughput per unit time of the storage 13 observed in time series. The volume performance information 48 is performance information such as the number of accesses and throughput per unit time, on the volumes 33*a* and 33*b* observed in time series.

The storage control function unit 45 processes I/O with respect to the storage devices 43*a* and 43*b* in response to an I/O request from the DB node 11. The remote copy function unit 49 copies volumes and journals stored in the storage devices 43*a* and 43*b* to the cloud site 2 in response to a remote copy request.

(Configuration of Compute Node 21)

Figure 4:
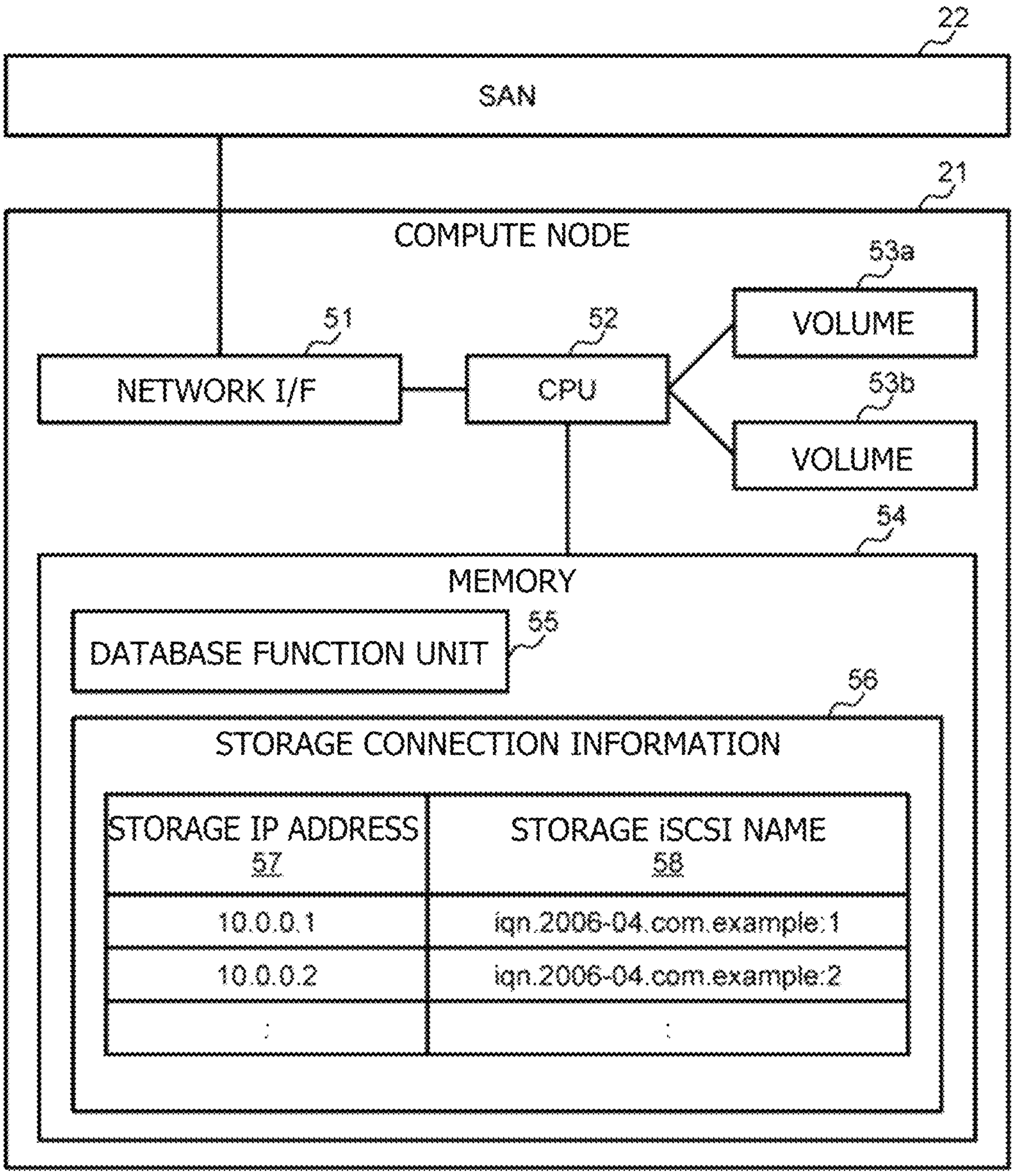
FIG. 4 is a diagram for depicting an example of a configuration of a compute node according to the first embodiment.

FIG. 4 is a diagram for depicting an example of a configuration of the compute node 21 according to the first embodiment. The compute node 21 has a network I/F 51, a CPU 52, volumes 53*a* and 53*b*, and a memory 54. The memory 54 stores a database function unit 55 and storage connection information 56.

The network I/F 51 is an interface used for the compute node 21 to communicate with the storage cluster 23 via the SAN 22.

The CPU 52 entirely controls the compute node 21 and executes a predetermined program to realize the database function unit 55. The volumes 53*a* and 53*b* are storage areas provided to the compute node 21 by the storage cluster 23.

The storage connection information 56 has columns of a storage IP address 57 and a storage iSCSI name 58. The database function unit 55 connects to the storage node 24 on the basis of the storage connection information 56 and realizes data access.

(Configuration of Storage Node 24)

Figure 5:
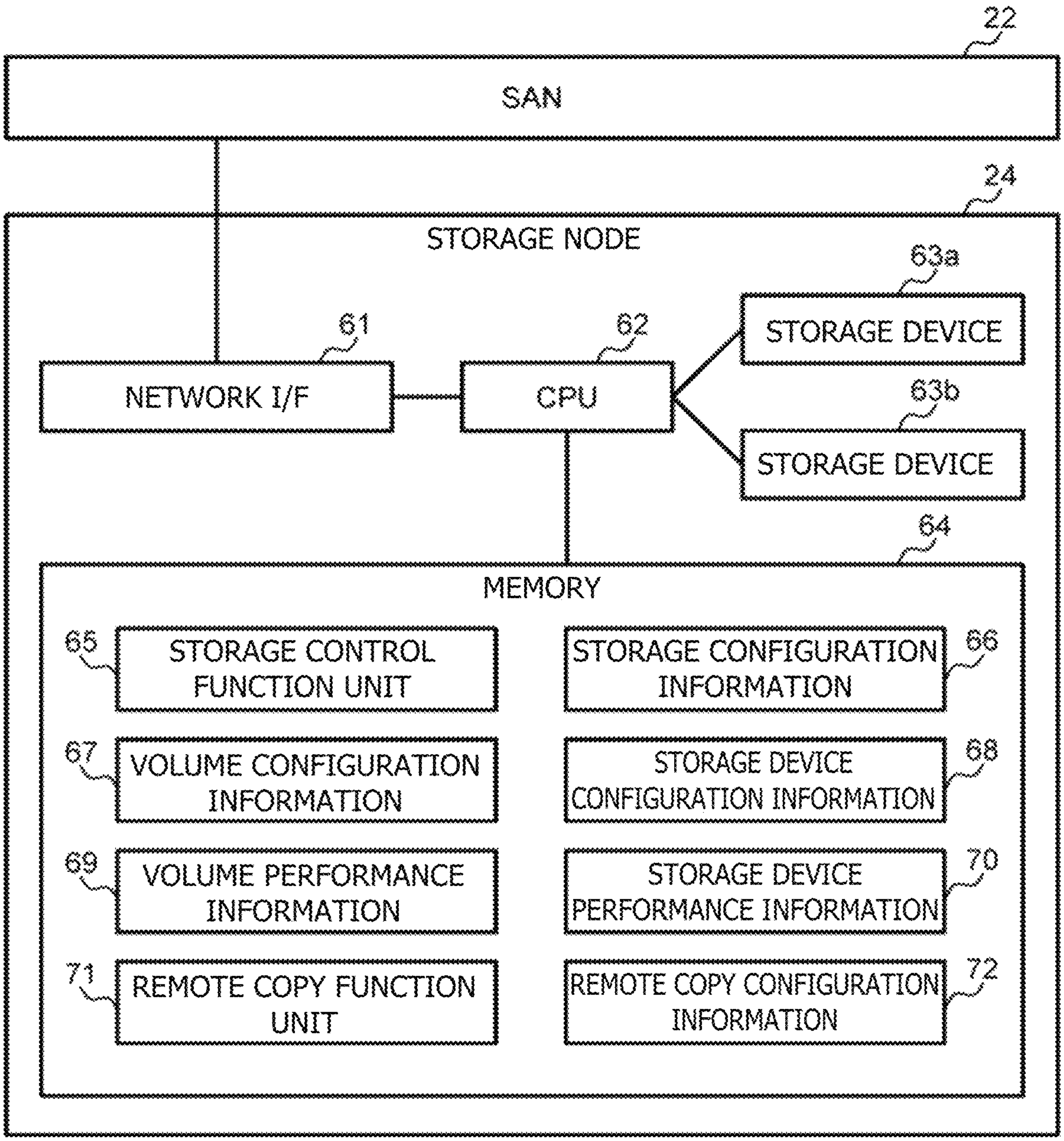
FIG. 5 is a diagram for depicting an example of a configuration of a storage node according to the first embodiment.

FIG. 5 is a diagram for depicting an example of a configuration of the storage node 24 according to the first embodiment. One storage cluster 23 includes a plurality of storage nodes 24. The storage node 24 has a network I/F 61, a CPU 62, storage devices 63*a* and 63*b*, and a memory 64. The memory 64 stores a storage control function unit 65. In addition, the memory 64 stores storage configuration information 66, volume configuration information 67, storage device configuration information 68, volume performance information 69, storage device performance information 70, a remote copy function unit 71, and remote copy configuration information 72.

The network I/F 61 is an interface used for the storage node 24 to communicate with the compute node 21 and the copy nodes 25*a* and 25*b* via the SAN 22.

The CPU 62 entirely controls the storage node 24 and executes a predetermined program to realize the storage control function unit 65 and the remote copy function unit 71.

(Configuration of Storage Configuration Information 66)

FIG. 6 is a diagram for depicting an example of a configuration of the storage configuration information 66 according to the first embodiment. The storage configuration information 66 manages information of the data protection type and node size of the storage node 24. The storage configuration information 66 has columns of a storage node ID 661, a data protection type 662, and a node size 663.

The storage node ID 661 is identification information of the storage node 24. The data protection type 662 is a protection type of the corresponding storage node 24. The data protection types include "Mirror," "mDnP," and the like. The "Mirror" is a protection scheme in which the same data is stored in two storage devices 63. The "mDnP" is a protection scheme in which data is stored in m pieces of storage devices 63 and parity data is stored in n pieces of storage devices 63. The data protection may be realized by, for example, erasure coding (EC) or redundant array of independent disks (RAID).

The node size 663 indicates the storage capacity of the storage node 24.

(Configuration of Volume Configuration Information 67)

FIG. 7 is a diagram for depicting an example of a configuration of the volume configuration information 67 according to the first embodiment. The volume configuration information 67 has columns of a volume ID 671, a storage node ID 672, a data protection storage node ID 673, a journal group ID 674, a volume type 675, and a snapshot source volume 676.

The volume ID 671 is volume identification information. The storage node ID 672 is identification information of the storage node 24 where the corresponding volume is arranged. The data protection storage node ID 673 is identification information of the storage node 24 where the protection data of the corresponding volume is arranged.

The journal group ID 674 is a journal group to which the corresponding volume belongs. The volume type 675 is information indicating whether the corresponding volume is a regular volume or a snapshot volume. The snapshot source volume 676 indicates identification information of the volume of the snapshot creation source in the case where the corresponding volume is a snapshot volume.

(Configuration of Storage Device Configuration Information 68)

FIG. 8 is a diagram for depicting an example of a configuration of the storage device configuration information 68 according to the first embodiment. The storage device configuration information 68 has columns of a storage node ID 681 and a storage device ID 682.

The storage node ID 681 is identification information of the storage node 24. The storage device ID 682 is identification information of the storage devices 63*a* and 63*b*. That is, the storage device configuration information 68 indicates the storage device 63 connected to each storage node 24.

(Configuration of Volume Performance Information 69)

FIG. 9 is a diagram for depicting an example of a configuration of the volume performance information 69 according to the first embodiment. The volume performance information 69 has columns of a storage node ID 691, a volume ID 692, a date and time 693, the number of reads 694, the number of writes 695, a read throughput 696, and a write throughput 697.

The storage node ID 691 is identification information of the storage node 24. The volume ID 692 is volume identification information. The date and time 693 is the date and time when the corresponding record has been recorded.

The number of reads 694 indicates the number of simultaneous reads from the volume identified by the corresponding storage node ID 691 and volume ID 692 at the corresponding date and time 693. The number of writes 695 indicates the number of simultaneous writes to the volume identified by the corresponding storage node ID 691 and volume ID 692 at the corresponding date and time 693.

The read throughput 696 and the write throughput 697 indicate each throughput of reading/writing for IOPS or the like with respect to the volume identified by the corresponding storage node ID 691 and volume ID 692 at the corresponding date and time 693.

(Configuration of Storage Device Performance Information 70)

FIG. 10 is a diagram for depicting an example of a configuration of the storage device performance information 70 according to the first embodiment. The storage device performance information 70 has columns of a storage node ID 701, a storage device ID 702, a date and time 703, the number of reads 704, the number of writes 705, a read throughput 706, and a write throughput 707.

The storage node ID 701 is identification information of the storage node 24. The storage device ID 702 is identification information of the storage device 63. The date and time 703 is the date and time when the corresponding record has been recorded.

The number of reads 704 indicates the number of simultaneous reads from the storage device 63 identified by the corresponding storage node ID 701 and storage device ID 702 at the corresponding date and time 703. The number of writes 705 indicates the number of simultaneous writes to the storage device 63 identified by the corresponding storage node ID 701 and storage device ID 702 at the corresponding date and time 703.

The read throughput 706 and the write throughput 707 indicate each throughput of reading/writing for IOPS or the like with respect to the storage device 63 identified by the corresponding storage node ID 701 and storage device ID 702 at the corresponding date and time 703.

(Configuration of Remote Copy Configuration Information 72)

FIG. 11 is a diagram for depicting an example of a configuration of the remote copy configuration information 72 according to the first embodiment. The remote copy configuration information 72 has columns of a storage ID 721, a volume ID 722, a storage node ID 723, and a volume ID 724.

The storage ID 721 is identification information of the storage 13. The volume ID 722 is identification information of the volume on the storage 13. The storage node ID 723 is identification information of the storage node 24. The volume ID 724 is identification information of the volume on the storage node 24. That is, the remote copy configuration information 72 indicates a correspondence relationship between the volume on the storage 13 and the volume on the storage node 24 to which the volume is remotely copied.

The explanation returns to FIG. 5. The storage control function unit 65 processes I/O with respect to the volume on the storage node 24 in response to an I/O request from the compute node 21. In addition, the storage control function unit 65 makes the volume and the journal, which are stored in its own storage node, redundant with another storage node 24 in cooperation with the other storage node 24 according to the designated protection type.

The remote copy function unit 71 copies the volume and the journal on the storage 13 to its own storage node 24 in cooperation with the remote copy function unit 49 of the storage 13 in response to a remote copy request.

(Configuration of Management Node 27)

Figure 12:
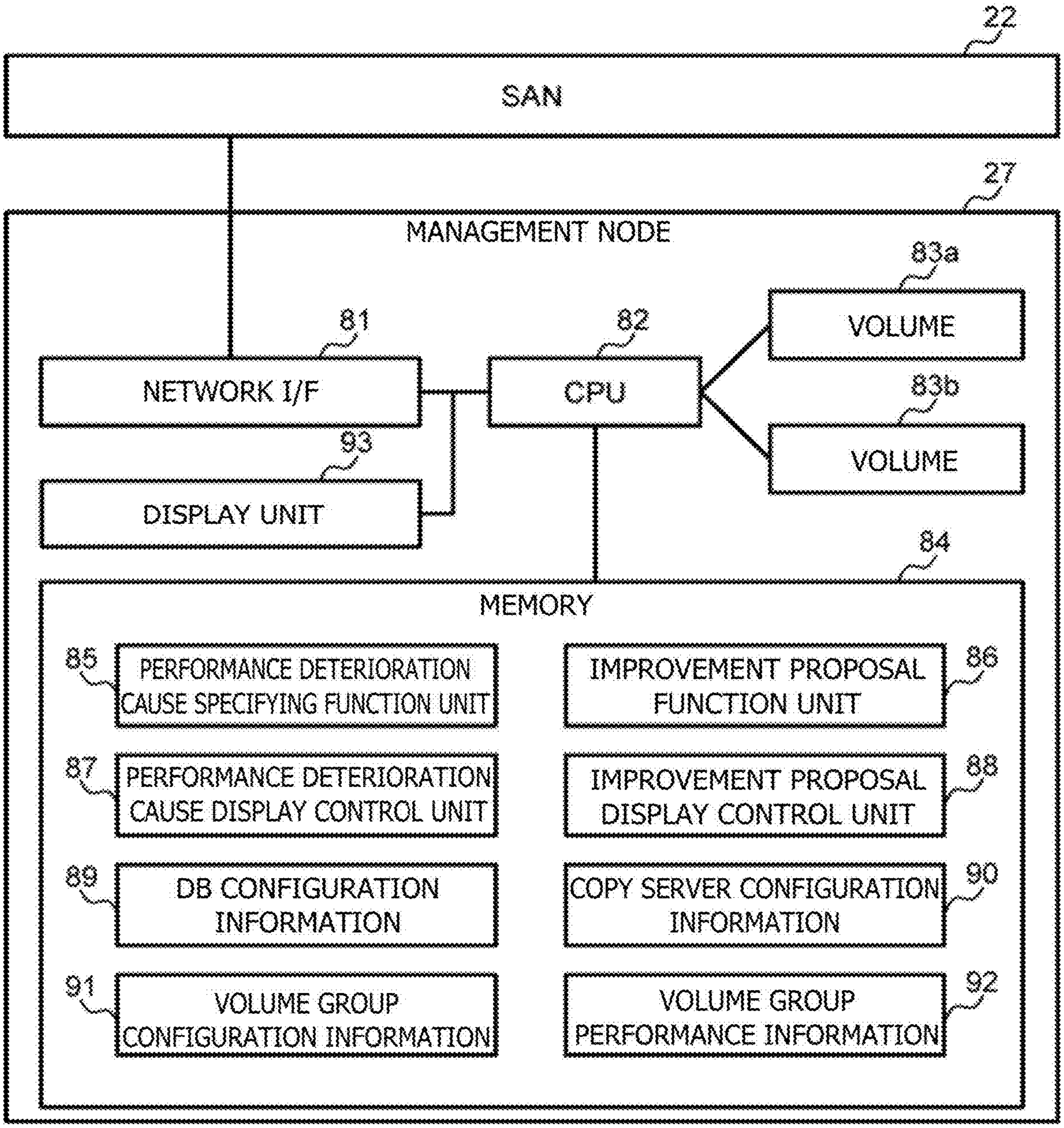
FIG. 12 is a diagram for depicting an example of a configuration of a management node according to the first embodiment.

FIG. 12 is a diagram for depicting an example of a configuration of the management node 27 according to the first embodiment. The management node 27 is a management apparatus that manages the compute node 21, the storage cluster 23 (storage system), and the copy node 25.

The management node 27 has a network I/F 81, a CPU 82, volumes 83*a* and 83*b*, a memory 84, and a display unit 93. The display unit 93 is a display apparatus or the like. The memory 84 stores a performance deterioration cause specifying function unit 85, an improvement proposal function unit 86, a performance deterioration cause display control unit 87, an improvement proposal display control unit 88, DB configuration information 89, copy server configuration information 90, volume group configuration information 91, and volume group performance information 92.

The network I/F 81 is an interface used for the management node 27 to communicate with the storage node 24 and the copy nodes 25*a* and 25*b* via the SAN 22.

The CPU 82 entirely controls the management node 27 and executes a predetermined program to realize the performance deterioration cause specifying function unit 85, the improvement proposal function unit 86, the performance deterioration cause display control unit 87, and the improvement proposal display control unit 88.

(Configuration of DB Configuration Information 89)

FIG. 13 is a diagram for depicting an example of a configuration of the DB configuration information 89 according to the first embodiment. The DB configuration information 89 has columns of a DB node ID 891, a storage node ID 892, and a volume ID 893.

The DB node ID 891 is identification information of the DB node 11. The storage node ID 892 is identification information of the storage node 24. The volume ID 893 is identification information of the volume on the storage node 24 identified by the storage node ID 892. That is, the DB configuration information 89 indicates a correspondence relationship between the DB node 11 and the volume on the storage node 24 accessed by the DB node 11.

(Configuration of Copy Server Configuration Information 90)

FIG. 14 is a diagram for depicting an example of a configuration of the copy server configuration information 90 according to the first embodiment. The copy server configuration information 90 has columns of a copy node ID 901, a storage node ID 902, and a volume ID 903.

The copy node ID 901 is identification information of the copy node 25. The storage node ID 902 is identification information of the storage node 24. The volume ID 903 is identification information of the volume on the storage node 24 identified by the storage node ID 902. That is, the copy server configuration information 90 indicates a correspondence relationship between the copy node 25 and the volume on the storage node 24 accessed by the copy node 25.

(Volume Group Configuration Information 91)

FIG. 15 is a diagram for depicting an example of a configuration of the volume group configuration information 91 according to the first embodiment. The volume group configuration information 91 has columns of a volume group ID 911, a volume ID 912, a compute type 913, and a compute ID 914.

The volume group ID 911 is identification information of a group of volumes created on the storage node 24. The volume ID 912 is identification information of the volume belonging to the volume group ID 911. The compute type 913 indicates the type of the computing resource that accesses the volume identified by a combination of the volume group ID 911 and the volume ID 912, and includes, for example, "DB" and "Copy." The "DB" indicates access by the DB node 11. The "Copy" indicates access by the copy node 25. The compute ID 914 indicates the computing resource that accesses the volume identified by a combination of the volume group ID 911 and the volume ID 912. For example, "DB 11*a*" indicates a DB node 11*a*. In addition, for example, "CN 25*a*" indicates the copy node 25*a*.

(Volume Group Performance Information 92)

FIG. 16 is a diagram for depicting an example of a configuration of the volume group performance information 92 according to the first embodiment. The volume group performance information 92 has columns of a volume group ID 921, a date and time 922, the number of accesses 923, and a throughput 924.

The volume group ID 921 is identification information of a group of volumes created on the storage node 24. The date and time 922 is the date and time when the corresponding record has been recorded. The number of accesses 923 is the total number of accesses to all the volumes belonging to the corresponding volume group ID 921 at the corresponding date and time 922. The throughput 924 indicates each throughput of reading/writing for IOPS or the like with respect to all the volumes belonging to the corresponding volume group ID 921 at the corresponding date and time 922.

(Regarding Volume Group)

Figure 17:
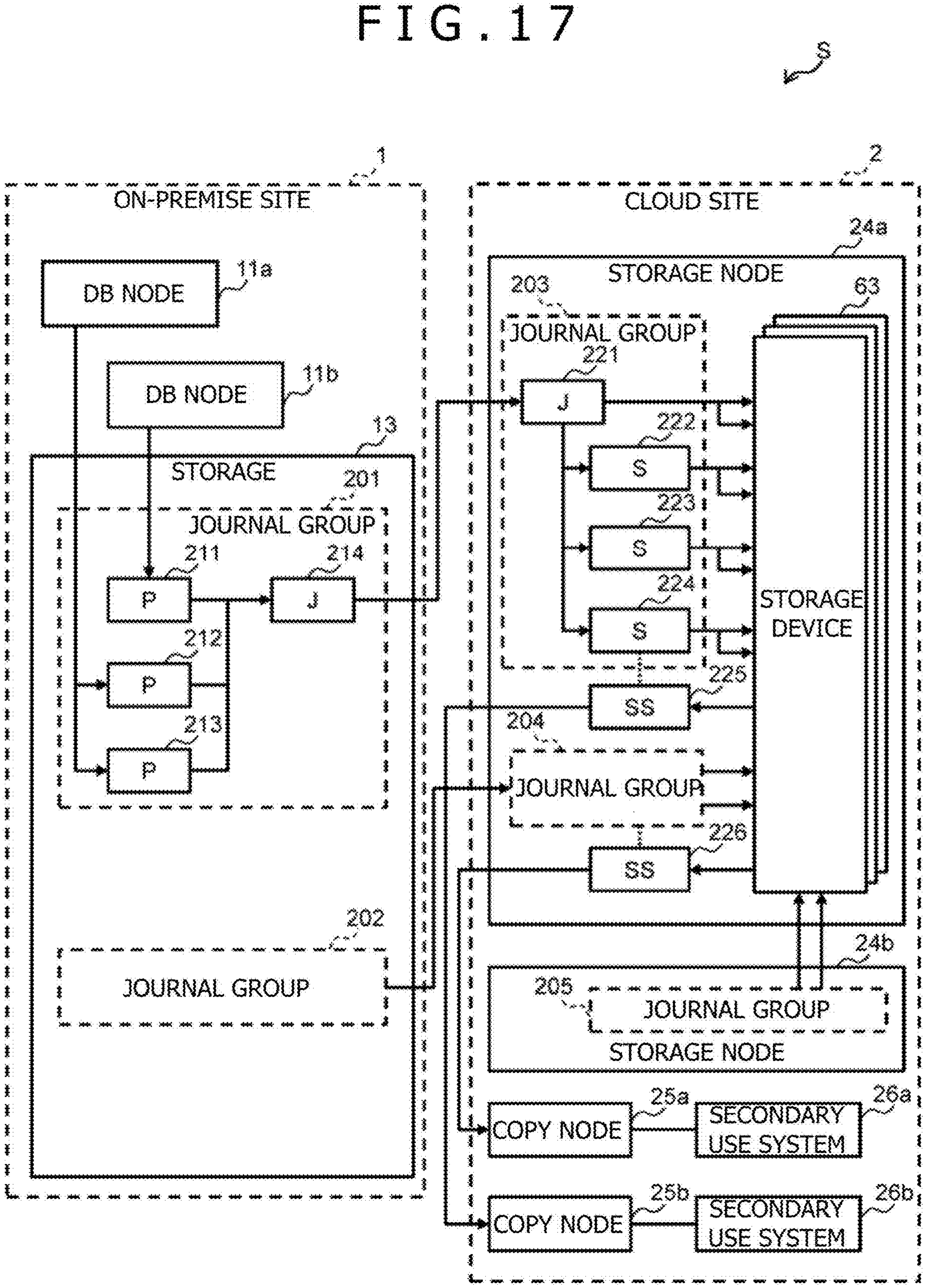
FIG. 17 is a diagram for depicting an example of a volume group according to the first embodiment.

FIG. 17 is a diagram for depicting an example of a volume group according to the first embodiment. The arrangement of each of a primary volume, a secondary volume, a journal volume, and a snapshot volume depicted in FIG. 17 is based on the exemplary content of the respective tables depicted in FIG. 6 to FIG. 11 and FIG. 13 to FIG. 16. In FIG. 17, "P" represents a primary volume, "S" represents a secondary volume paired with the primary volume, "J" represents a journal volume, and "SS" represents a snapshot volume of the secondary volume.

As depicted in FIG. 17, the DB nodes 11*a* and 11*b* are operated in the on-premise data center 1. The DB node 11*a* accesses primary volumes 212 and 213. The DB node 11*b* accesses a primary volume 211. The primary volumes 211, 212, and 213 belong to a journal group 201. The primary volumes 211, 212, and 213 write journal data into a journal volume 214. The journal group is a logical volume group whose history is managed by one journal volume.

On the other hand, in the cloud site 2, the storage node 24*a* creates a journal volume 221 that is the copy of the journal volume 214. Secondary volumes 222, 223, and 224 are created on the basis of journal data stored in the journal volume 221, as remote copies of the primary volumes 211, 212, and 213. The secondary volumes 222, 223, and 224 belong to a journal group 203.

Depending on the data protection type (storage configuration information 66 (FIG. 6)) of the storage node 24*a*, the number N (N is a positive integer) of storage devices 63 to which the volume is written differs. As described above, in the case where the data protection type is "Mirror," N is 2, and in the case where the data protection type is "mDnP," N is (m+n). The "number of DB writes" to be described later is multiplied by N when the access load is calculated.

A snapshot volume 225 is a snapshot of the secondary volume 224 belonging to the journal group 203. The snapshot volume 225 is accessed by the copy node 25*b* where the secondary use system 26*b* is operated.

As similar to the above, a primary journal group 202 in the on-premise data center 1 and a secondary journal group 204 in the cloud site 2 form a pair. A snapshot volume 226 is a snapshot of a certain secondary volume xxx (see FIG. 7) belonging to the journal group 204. The snapshot volume 226 is accessed by the copy node 25*a* where the secondary use system 26*a* is operated.

In addition, in a journal group 205 on the storage node 24*b*, mirroring for data protection is configured by using the storage device 63 of the storage node 24*a*. This means that the site for creating the remote copy on the cloud site 2 is not limited to the on-premise data center 1 but may be another cloud site. That is, the embodiment can be applied to a multi-cloud in addition to a hybrid cloud as in the present embodiment.

In such a volume arrangement, the following access loads (1) to (2) become a problem.

(1) The access load on the storage device 63 by remote copy from the journal groups 201 and 202 of the on-premise data center 1 and the journal group 205 on the storage node 24*b* of the cloud site 2 to the storage node 24*a*

(2) The access load on the storage device 63 via the snapshot volumes 225 and 226 by the secondary use system 26 on the copy node 25

(Performance Deterioration Cause Specifying Processing According to First Embodiment)

Figure 18:
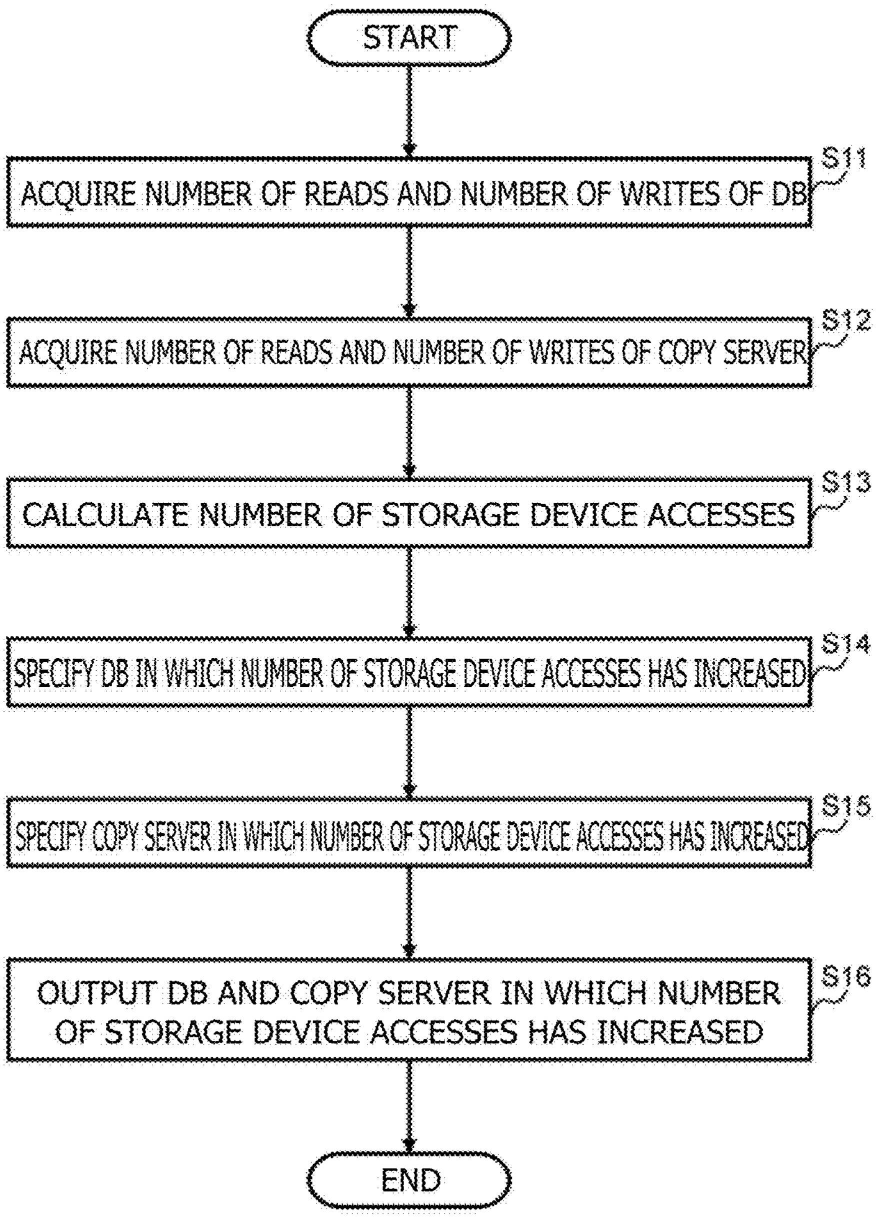
FIG. 18 is a flowchart for depicting an example of performance deterioration cause specifying processing according to the first embodiment.

FIG. 18 is a flowchart for depicting an example of performance deterioration cause specifying processing according to the first embodiment.

Prior to the performance deterioration cause specifying processing, the performance deterioration cause specifying function unit 85 (FIG. 12) of the management node 27 refers to the storage device performance information 70 (FIG. 10). Then, the performance deterioration cause specifying function unit 85 refers to the number of reads 704, the number of writes 705, the read throughput 706, and the write throughput 707 for each storage node ID 701 and each date and time 703.

Then, the performance deterioration cause specifying function unit 85 determines whether or not an access number total value X1 that is the sum of the number of reads 704 and the number of writes 705 exceeds a predetermined threshold, for each storage node ID 701 and each date and time 703. In addition, the performance deterioration cause specifying function unit 85 determines whether or not a throughput total value X2 that is the sum of the read throughput 706 and the write throughput 707 exceeds a predetermined threshold. Then, the performance deterioration cause specifying processing is executed for the storage node 24 at the date and time 703 when the access number total value X1 or the throughput number total value X2 exceeds the predetermined threshold. In the present embodiment, it is assumed that the access number total value X1 or the throughput total value X2 of the storage node 24*a* exceeds the predetermined threshold.

It should be noted that an "access amplification coefficient" is a coefficient for amplifying the value of each index, which is set for each read and write and for each index, such as IOPS at the time of reading, IOPS at the time of writing, throughput at the time of reading, and throughput at the time of writing for each data protection type.

First, in Step S11, the performance deterioration cause specifying function unit 85 acquires the number of reads R1 and the number of writes W1 for each DB node 11. That is, the performance deterioration cause specifying function unit 85 refers to the DB configuration information 89 (FIG. 13) and acquires the storage node ID 892 and the volume ID 893 for each DB node (DB node ID 891). Then, on the basis of the acquired storage node ID 892 and volume ID 893, the performance deterioration cause specifying function unit 85 refers to the volume performance information 69 (FIG. 9) of the corresponding storage node 24*a* and acquires the number of reads 694 and/or the number of writes 695 at the latest date and time 693. In this way, the number of reads R1 and the number of writes W1 when each DB node 11 accesses each volume are acquired.

Next, in Step S12, the performance deterioration cause specifying function unit 85 acquires the number of reads R2 and the number of writes W2 for each copy server. That is, the performance deterioration cause specifying function unit 85 refers to the copy server configuration information 90 (FIG. 14) and acquires the storage node ID 902 and the volume ID 903 for each copy server (copy node ID 901). Then, on the basis of the acquired storage node ID 902 and volume ID 903, the performance deterioration cause specifying function unit 85 refers to the volume performance information 69 (FIG. 9) of the corresponding storage node 24*a* and acquires the number of reads 694 at the latest date and time 693. In this way, the number of reads R2 and the number of writes W2 when each copy server accesses each volume are acquired.

Next, in Step S13, the performance deterioration cause specifying function unit 85 calculates the number of storage device accesses A1 based on the number of reads R1 and the number of writes W1 for each DB node 11 on the basis of Equation (1). In addition, the performance deterioration cause specifying function unit 85 calculates the number of storage device accesses A2 based on the number of reads R2 and the number of writes W2 for each copy server on the basis of Equation (2). It should be noted that "N1" and "N2" denote the numbers of storage devices 63 to be written according to the data protection type, and "α1," "β1," "α2," and "β2" denote predetermined "access amplification coefficients."

$$A1 = \alpha 1 \times R1 + N1 \times \beta 1 \times W1 \quad (1)$$

-continued $$A2 = \alpha 2 \times R2 + N2 \times \beta 2 \times W2 \quad (2)$$

Next, in Step S14, the performance deterioration cause specifying function unit 85 specifies, as the performance deterioration cause, the DB node 11 in which the number of storage device accesses A1 calculated in Step S13 has increased over a predetermined value (for example, 40%) in a certain period of time. The "certain period of time" may be an acquisition interval of the date and time 693 in the volume performance information 69 (FIG. 9), or may be a time obtained by gathering a certain number of acquisition intervals. In Step S14, an increase rate of the latest number of storage device accesses A1 to the number of storage device accesses A1 in the past is calculated for a certain period of time, and it is determined whether the increase rate has exceeded a predetermined value.

Next, in Step S15, the performance deterioration cause specifying function unit 85 specifies, as the performance deterioration cause, the copy server (copy node 25) in which the number of storage device accesses A2 calculated in Step S13 has increased by a predetermined amount (for example, 40%) or more in a certain period of time. This "certain period of time" is also similar to the "certain period of time" in Step S14. In Step S15, an increase rate of the latest number of storage device accesses A2 to the number of storage device accesses A2 in the past is calculated for a certain period of time, and it is determined whether the increase rate has exceeded a predetermined value.

Next, in Step S16, the performance deterioration cause display control unit 87 outputs the DB node 11 specified in Step S14 and the copy server (copy node 25) specified in Step S15 to a performance deterioration cause display screen 87D (FIG. 19).

(Configuration of Performance Deterioration Cause Display Screen 87D)

FIG. 19 is a diagram for depicting an example of a configuration of the performance deterioration cause display screen 87D according to the first embodiment. The performance deterioration cause display screen 87D has display items of a storage node having a value exceeding threshold 301, a compute node ID 311, an access number increase rate 312, and a performance deterioration factor 313.

The storage node having a value exceeding threshold 301 indicates the storage node 24 in which the access number total value X1 or the throughput total value X2, which has triggered the execution of the performance deterioration cause specifying processing (FIG. 18), exceeds a predetermined threshold (the storage node 24*a* in the present embodiment).

The compute node ID 311 indicates the DB node 11 or the copy node 25 that accesses the storage node 24*a* in which the access number total value X1 or the throughput total value X2, which has triggered the execution of the performance deterioration cause specifying processing (FIG. 18), exceeds a predetermined threshold. The DB node 11 indicated by the compute node ID 311 can be acquired from the DB configuration information 89 (FIG. 13). The copy node 25 indicated by the compute node ID 311 can be acquired from the copy server configuration information 90 (FIG. 14).

The access number increase rate 312 is calculated in Steps S13, S14, and S15 of the performance deterioration cause specifying processing (FIG. 18). In the performance deterioration factor 313, "○" is input to the DB node 11 or the copy node 25 specified as the performance deterioration cause in Steps S14 and S15 of the performance deterioration cause specifying processing (FIG. 18).

(Improvement Proposal Processing According to First Embodiment)

Figure 20:
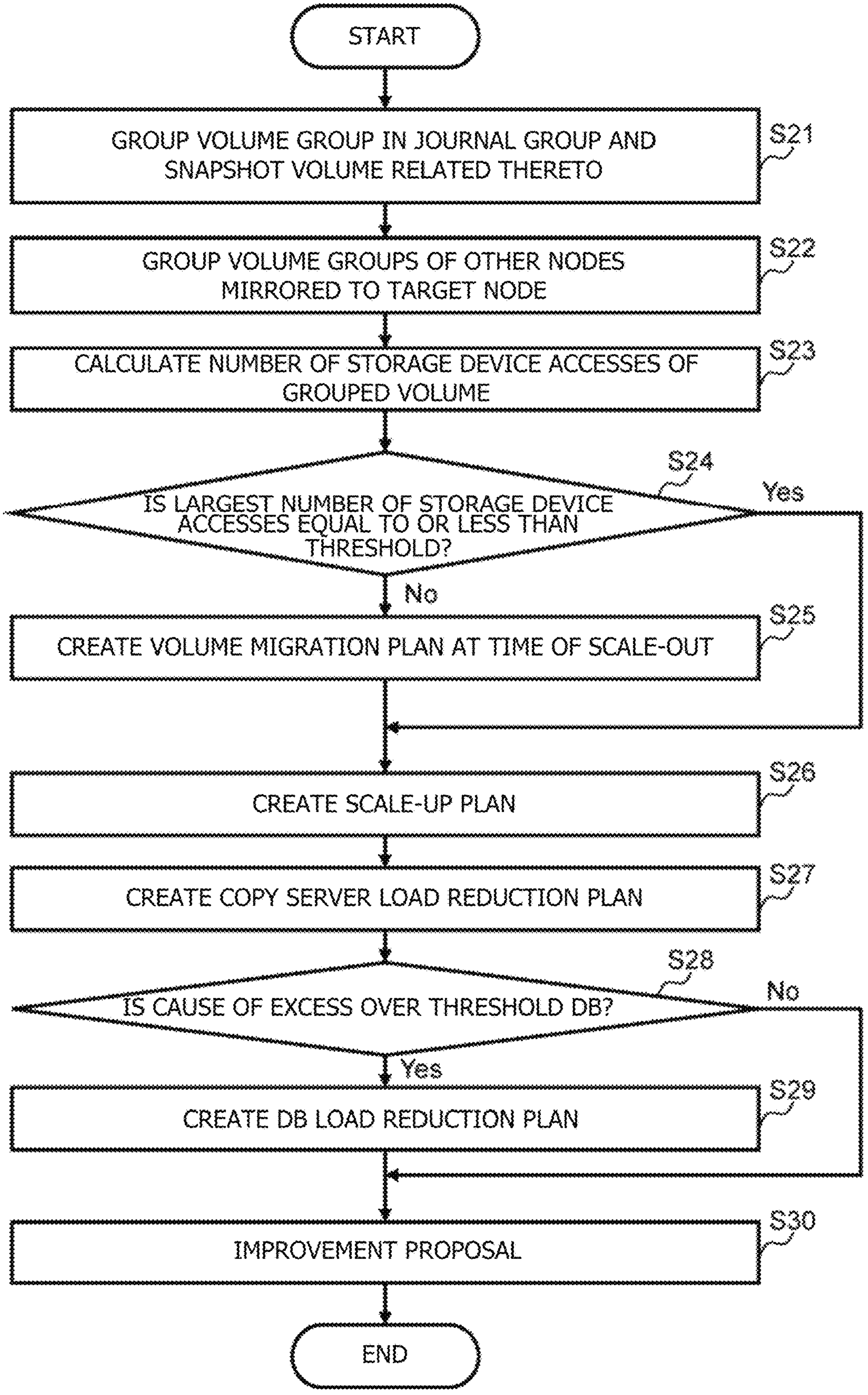
FIG. 20 is a flowchart for depicting an example of improvement proposal processing (at the time of overload) according to the first embodiment.

FIG. 20 is a flowchart for depicting an example of improvement proposal processing (at the time of overload) according to the first embodiment. In the present embodiment, it is monitored whether or not the access number total value X1 or the throughput total value X2 described above exceeds a predetermined threshold, and in the case where the storage node 24 is overloaded, resource expansion such as scale-out (addition of the storage node 24) or scale-up is proposed.

The improvement proposal processing according to the present embodiment is executed in the case where the access number total value X1 or the throughput total value X2 described above has exceeded a predetermined threshold, as similar to the performance deterioration cause specifying processing according to the first embodiment (FIG. 18). The improvement proposal processing is sequentially performed after the performance deterioration cause specifying processing is executed.

First, in Step S21, the improvement proposal function unit 86 (FIG. 12) of the management node 27 groups volume groups in the journal groups 203 and 204 and snapshot volumes associated with the volume groups, for the target node. In the present embodiment, the "target node" is the storage node 24*a* in which the access number total value X1 or the throughput total value X2 has exceeded the predetermined threshold.

Specifically, in the example depicted in FIG. 17, the storage node 24*a* is the target node. In this case, the volume groups (the journal volume 221 and the secondary volumes 222, 223, and 224) belonging to the journal group 203 and the snapshot volume 225 of the secondary volume 224 are grouped as "VG1" of the volume group ID 911. As similar to the above, the journal group 204 and the snapshot volume 226 are grouped as a group whose volume group ID 911 is "VG2." The result of this grouping is as depicted in the volume group configuration information 91 (FIG. 15).

Next, in Step S22, the improvement proposal function unit 86 groups the volume groups of another node mirrored to the target node. Specifically, in the example depicted in FIG. 17, the target node is the storage node 24*a*, and the storage node mirrored to the storage node 24*a* is the storage node 24*b*. Therefore, the volume group in the journal group in the storage node 24*b* and the snapshot volume associated with the volume group are grouped. The result of this grouping is stored in the volume group configuration information 91 (FIG. 15) as similar to Step S21.

Next, in Step S23, the improvement proposal function unit 86 calculates the number of storage device accesses of the volume group grouped in Steps S21 and S22. Specifically, the number of storage device accesses for each volume of the storage node 24*a* accessed by the DB node 11 is calculated from Equation (1) described above. In addition, the number of storage device accesses for each volume of the storage node 24*a* accessed by the copy node 25 is calculated from Equation (2) described above. From these, the number of storage device accesses for each volume group is calculated. The number of storage device accesses for each volume group is stored in the volume group performance information 92 (FIG. 16) together with the date and time 922 that is a time stamp at the time of calculation.

Next, in Step S24, the improvement proposal function unit 86 determines whether or not the latest and largest number of storage device accesses among the numbers of storage device accesses for the respective volume groups calculated in Step S23 is equal to or less than a threshold. The improvement proposal function unit 86 shifts the processing to Step S26 in the case where the latest and largest number of storage device accesses is equal to or less than the threshold (Yes in Step S24), and in the case where it is larger than the threshold (No in Step S24), the improvement proposal function unit 86 shifts the processing to Step S25.

In Step S25, the improvement proposal function unit 86 creates a volume migration plan at the time of scale-out. The volume migration plan is a plan in which the load distribution of the storage node 24 is proposed, by scaling out to another storage node 24 other than the storage node 24*a* in units of volume groups in such a manner that the access number total value X1 or the throughput total value X2 becomes equal to or less than the predetermined threshold.

In Step S26 following Step S24 or S25, the improvement proposal function unit 86 creates a "scale-up plan." The scale-up plan is a plan in which the scale-up of the overloaded storage node 24 (the storage node 24*a* in the present embodiment) is proposed such that the access number total value X1 or the throughput total value X2 becomes equal to or less than the predetermined threshold. In addition, the scale-up plan may include a proposal of scale-up of the other storage nodes 24 belonging to the storage cluster 23 including the overloaded storage node 24.

Next, in Step S27, the improvement proposal function unit 86 creates a copy server load reduction plan. The copy server load reduction plan is a plan in which stopping one or more copy servers (copy nodes 25) is proposed such that the access number total value X1 or the throughput total value X2 becomes equal to or less than the predetermined threshold.

Next, in Step S28, the improvement proposal function unit 86 determines whether the cause of the excess over the threshold of the access number total value X1 or the throughput total value X2 is the DB (DB node 11). The improvement proposal function unit 86 refers to the execution result (for example, the performance deterioration cause display screen 87D (FIG. 19)) of the performance deterioration cause specifying processing (FIG. 18) and can determine whether the cause of the excess over the threshold (performance deterioration) of the access number total value X1 or the throughput total value X2 is the DB (DB node 11). The improvement proposal function unit 86 shifts the processing to Step S29 in the case where the cause of the excess over the threshold is the DB (Yes in Step S28), and in the case where the cause of the excess over the threshold is not the DB (No in Step S28), the improvement proposal function unit 86 shifts the processing to Step S30.

In Step S29, the improvement proposal function unit 86 creates a DB load reduction plan. The improvement proposal function unit 86 refers to the volume group configuration information 91 (FIG. 15) to acquire the number of volumes in the storage node 24 accessed by the DB node 11 determined to be the cause of the excess over the threshold in Step S28, and divides "100%" by the number of volumes. The DB load reduction plan displays the result of the division as a load reduction rate in the case where each DB node 11 is deleted.

Next, in Step S30, the improvement proposal display control unit 88 displays each countermeasure on the improvement proposal screen 88D (FIG. 21) on the display unit 93. The countermeasures are the volume migration plan (scale-out plan) at the time of scale-out created in Step S25, the scale-up plan created in Step S26, and the load reduction plan created in Step S27.

The user selects any one of the countermeasures of the scale-out plan, the scale-up plan, and the load reduction plan displayed on the improvement proposal screen 88D and presses a selection button 88D1 (FIG. 21). Then, the countermeasure is executed by the DB node 11, the storage cluster 23, the storage node 24, and/or the copy node 25 under the instruction of the management node 27.

When the scale-out plan is executed, the copy setting between the storage 13 and the storage node 24 included in the storage cluster 23 is changed, and connection to the volume on the storage node 24 of the scale-out destination is set.

(Configuration of Improvement Proposal Screen 88D (at the Time of Overload))

FIG. 21 is a diagram for depicting an example of a configuration of the improvement proposal screen 88D (at the time of overload) according to the first embodiment. The improvement proposal screen 88D depicted in FIG. 21 depicts the "scale-out plan," the "scale-up plan," and the "load reduction plan" so that the user can select them.

On the improvement proposal screen 88D depicted in FIG. 21, the "scale-out plan" has displays of the current number of storage nodes 321 and the number of storage nodes after scale-out 322.

The current number of storage nodes 321 indicates the number of storage nodes 24 before scale-up by the processing in Step S26 (FIG. 20). The number of storage nodes after scale-out 322 indicates the number of storage nodes 24 after scale-up by the processing in Step S26.

In addition, on the improvement proposal screen 88D depicted in FIG. 21, the "scale-out plan" has displays of a volume ID 331, a compute ID 332, a migration permission 333, and a migration destination storage node ID 334.

The volume ID 331 indicates a list of identification information of volumes on the storage node 24. The compute ID 332 indicates identification information of the computing resource (the DB node 11 or the copy node 25) that accesses the volume identified by the volume ID 331. The migration permission 333 indicates whether the corresponding volume can be migrated to another storage node 24 in the volume migration plan created in Step S25 (FIG. 20). In the migration permission 333, "○" indicates that the migration is possible, and "-" indicates that the migration is impossible. The migration destination storage node ID 334 indicates identification information of the storage node 24 of the migration destination in the case where the corresponding volume can be migrated.

In addition, on the improvement proposal screen 88D depicted in FIG. 21, the "scale-up plan" has displays of a storage node ID 341, a current node size 342, and a node size after scale-up 343.

The storage node ID 341 is identification information of the storage node 24. The current node size 342 indicates the node size before the scale-up of the corresponding storage node 24 in the scale-up plan created in Step S26 (FIG. 20). In addition, the node size after scale-up 343 indicates the node size after the scale-up of the corresponding storage node 24 in the scale-up plan created in Step S26.

In addition, on the improvement proposal screen 88D depicted in FIG. 21, the "load reduction plan" has displays of a compute ID 351, a volume ID 352, and a load reduction rate 353.

The compute ID 351 is identification information of the DB node 11 or the copy node 25 that is proposed to stop in Step S27 (FIG. 20). The volume ID 352 is identification information of the volume accessed by the corresponding DB node 11 or copy node 25. The load reduction rate 353 indicates the ratio of the load reduced by stopping the corresponding DB node 11 or copy node 25 to the total load. In the case where the load reduction plan is selected, the user can also specify the compute ID 351 and specify which DB node 11 or copy node 25 is to be stopped.

Modified Example of First Embodiment

In Step S21 of the present embodiment, the snapshot is included in the volume group, and the volume group including the snapshot is migrated to the storage node 24 of the scale-out destination. The present invention is not limited to this, and a countermeasure may be created in which the snapshot is not included in the volume group, is deleted at the time of scale-out, and is re-created from the volume migrated in the storage node 24 of the scale-out destination. By allowing the storage cluster 23 or the storage node 24 to execute this countermeasure, the volume migration accompanying scale-out or scale-in can be quickly performed.

Effect of First Embodiment

In the first embodiment, the DB node 11 and the copy node 25 in which the increase rate of the number of accesses to the storage device 63 for each DB node 11 and the increase rate of the number of accesses to the storage device 63 for each copy node 25 have exceeded the threshold are specified. Then, information related to the specified DB node 11 and copy node 25 is displayed on the display unit 93.

Therefore, according to the first embodiment, the user can know whether the performance deterioration of the storage node 24 is caused by the remote copy or the secondary use of data, and can appropriately improve the performance.

In addition, in the first embodiment, the number of accesses to the storage device 63 for each DB node 11 is calculated on the basis of the number of reads and the number of writes from/to the storage device 63 for each DB node 11, the number of storage devices 63 for each data protection type, and the access amplification coefficient. In addition, the number of accesses to the storage device 63 for each copy node 25 is calculated on the basis of the number of reads and the number of writes for each copy node 25, the number of storage devices 63 for each data protection type, and the access amplification coefficient.

Therefore, according to the first embodiment, the number of accesses to the storage device 63 can be appropriately estimated on the basis of the data protection type and the access amplification coefficient.

In addition, in the first embodiment, volume groups including the volumes of the remote copy destination are created, and in the case where the number of accesses related to any volume group exceeds a threshold, the storage of the remote copy destination is scaled out to add the storage node 24. Then, a countermeasure including the scale-out plan for migrating the volume group in which the number of accesses has exceeded the threshold to the added storage node 24 is created and displayed.

Therefore, according to the first embodiment, since the scale-out is performed in units of volume groups, the scale-out can be performed while maintaining the data consistency of the related volumes.

In addition, in the first embodiment, the scale-out plan is created in which the snapshot is included in the volume group, and the volume group including the snapshot is migrated to the added storage node 24.

Therefore, in the first embodiment, the scale-out can be performed in units of volume groups including the snapshot while maintaining the data consistency of the related volumes.

In addition, in the first embodiment, the volume group from which the snapshot is excluded is migrated to the added storage node. Then, the scale-out plan is created in which a snapshot is newly created on the basis of the volume included in the volume group in the storage node 24 of the migration destination where the volume group has been migrated.

Therefore, according to the first embodiment, the scale-out can be quickly completed by the volume group including no snapshot.

In addition, in the first embodiment, a volume group including a volume on another storage node 24 having a redundant configuration with the storage node 24 having the storage device 63 in which the number of accesses or the throughput has exceeded the threshold is created. Then, the number of accesses to the storage device 63 for each volume group is calculated and compared with a threshold. Then, in the case where the number of accesses related to any of second volume groups exceeds the threshold, the corresponding storage is scaled out to add the storage node 24. Then, the scale-out plan for migrating the volume group in which the number of accesses has exceeded the threshold to the added storage node 24 is created.

Therefore, according to the first embodiment, the overload of the access due to the remote copy in the multi-cloud environment can also be eliminated by the scale-out.

In addition, in the first embodiment, a countermeasure for scaling up the storage node 24 having the storage device 63 in which the number of accesses or throughput has exceeded a threshold is created.

Therefore, according to the first embodiment, the overload of the access to the storage device 63 can be eliminated by the scale-up.

In addition, in the first embodiment, a server reduction plan for reducing the copy node 25 in which the increase rate of the number of accesses to the storage device 63 or the throughput has exceeded a threshold is created.

Therefore, according to the first embodiment, the overload of the access to the storage device 63 can be eliminated by reducing the copy node 25.

Second Embodiment

In the first embodiment, it is monitored whether or not the access number total value X1 or the throughput total value X2 exceeds a predetermined threshold, and in the case where the storage node 24 is overloaded, resource expansion such as scale-out (addition of the storage node 24) or scale-up is proposed. On the other hand, there is a case where the load of the storage node 24 is small and the resources allocated to the storage node 24 are excessive. In a second embodiment, in the case where there is a surplus of resources, the resources are reduced to suppress wasteful resource charging.

(Improvement Proposal Processing According to Second Embodiment (at the Time of Reducing Storage Node)

Figure 22:
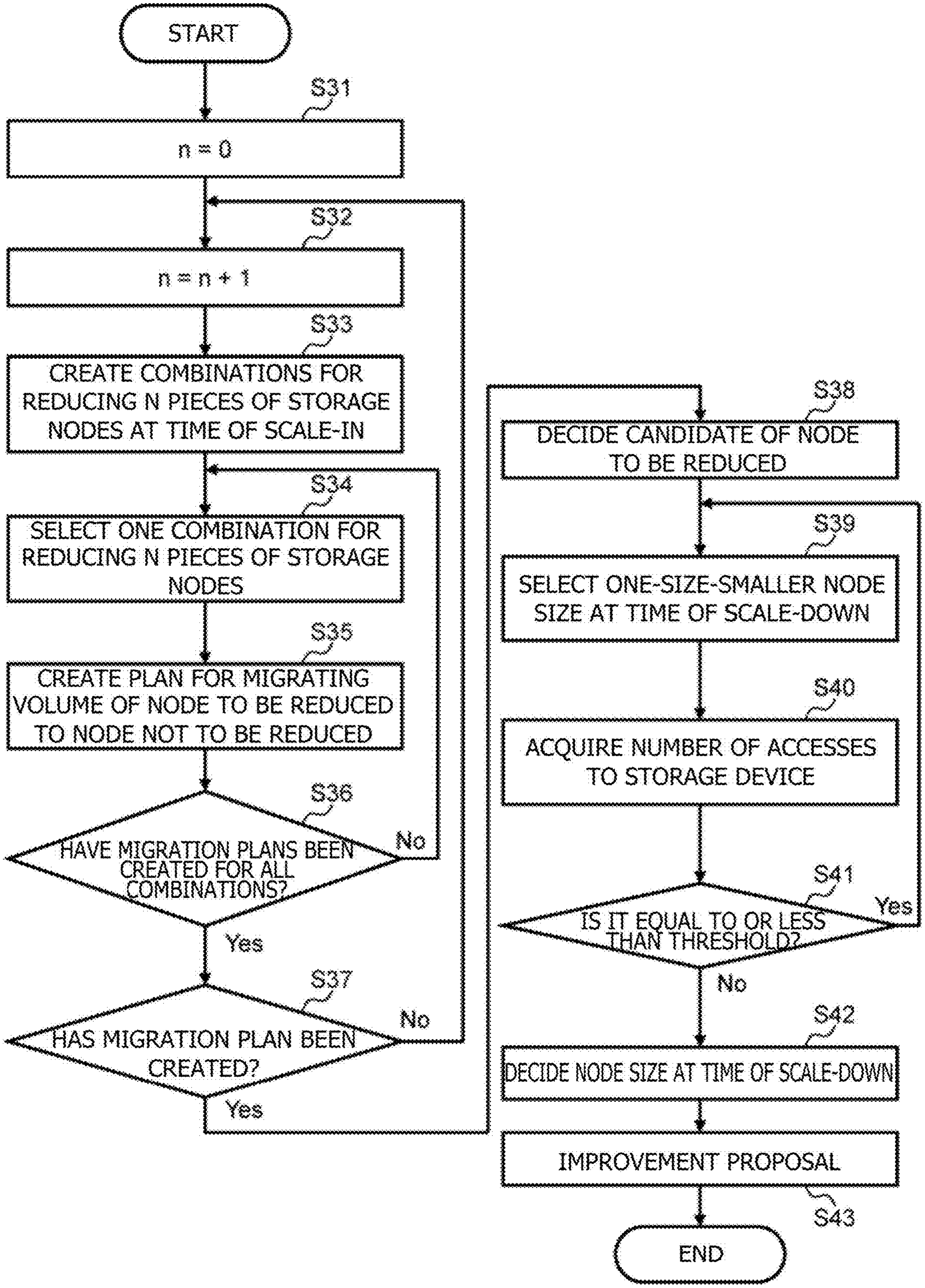
FIG. 22 is a flowchart for depicting an example of improvement proposal processing (at the time of reducing storage node) according to a second embodiment.

FIG. 22 is a flowchart for depicting an example of the improvement proposal processing (at the time of reducing storage node) according to the second embodiment. The improvement proposal processing (at the time of reducing storage node) is executed, for example, at a constant cycle.

First, in Step S31, the improvement proposal function unit 86 (FIG. 12) initializes the reduction number n of storage nodes 24 to be reduced at the time of scale-in to n=0. Next, in Step S32, the improvement proposal function unit 86 increments the reduction number n by 1.

Next, in Step S33, the improvement proposal function unit 86 creates "combinations for reducing n pieces of storage nodes 24" at the time of scale-in. Next, in Step S34, the improvement proposal function unit 86 selects one unselected combination from the "combinations for reducing n pieces of storage nodes 24" created in Step S33. Next, in Step S35, the improvement proposal function unit 86 creates a volume migration plan for migrating the volume of the storage node 24 to be reduced to another storage node 24 not to be reduced in the "combinations for reducing n pieces of storage nodes 24."

Next, in Step S36, the improvement proposal function unit 86 determines whether the volume migration plans have been created for all the "combinations for reducing n pieces of storage nodes 24." In the case where the volume migration plans have been created for all the "combinations for reducing n pieces of storage nodes 24" (Yes in Step S36), the improvement proposal function unit 86 shifts the processing to Step S37. On the other hand, in the case where there is "a combination for reducing n pieces of storage nodes 24" for which no volume migration plan has been created (No in Step S36), the improvement proposal function unit 86 returns the processing to Step S34.

In Step S37, the improvement proposal function unit 86 determines whether the volume migration plan has been created. In Step S37, it is determined whether one or more volume migration plans for migrating the volume of the storage node 24 to be reduced to another storage node 24 not to be reduced have been created. The "volume migration plan has been created" refers to a case where the number of accesses to the storage device 63 in the storage node 24 not to be reduced becomes equal to or less than a threshold when the volume of the storage node 24 to be reduced is migrated to the storage node 24 not to be reduced. The number of accesses is the number of storage device accesses A1 and the number of storage device accesses A2 described above.

The improvement proposal function unit 86 shifts the processing to Step S38 in the case where one or more volume migration plans can be created (Yes in Step S37), and in the case where no volume migration plan can be created (No in Step S37), the improvement proposal function unit 86 returns the processing to Step S32.

In Step S38, the improvement proposal function unit 86 decides a candidate of the storage node 24 to be reduced. Among the "combinations for reducing n pieces of storage nodes 24," a combination in which the number of accesses to the storage device 63 of each storage node 24 is equal to or less than a predetermined threshold and the maximum value of the number of accesses is the smallest as compared with the other volume migration plans in the largest reduction number n is used as a candidate. That is, in Step S38, the "combination for reducing n pieces of storage nodes 24" having the largest reduction number n by which the number of accesses to the storage device 63 is the most levelled is decided as a candidate.

Next, in Step S39, the improvement proposal function unit 86 selects a one-size-smaller node size at the time of scale-down. In Step S39, when the storage node 24 is reduced, the node size of the storage node 24 not to be reduced is reduced by one size to be scaled down.

Next, in Step S40, the improvement proposal function unit 86 acquires the number of accesses to the storage device 63 in the storage node 24 whose node size has been scaled down in Step S39. The number of accesses is the number of storage device accesses A1 and the number of storage device accesses A2 described above.

Next, in Step S41, the improvement proposal function unit 86 determines whether the number of accesses to the storage device acquired in Step S40 is equal to or less than a threshold. The improvement proposal function unit 86 returns the processing to Step S39 in the case where the number of accesses to the storage device is equal to or less than the threshold (Yes in Step S41), and in the case where the number of accesses to the storage device exceeds the threshold (No in Step S41), the improvement proposal function unit 86 shifts the processing to Step S42.

In Step S42, the improvement proposal function unit 86 decides the node size before reducing the size in Step S39 executed last, as the node size at the time of scale-down.

Next, in Step S43, the improvement proposal display control unit 88 displays the storage node 24 to be reduced, which has been decided in Step S38, the reduction number n, the volume migration plan (scale-in plan), and the node size at the time of scale-down (scale-down plan) decided in Step S42. The improvement proposal display control unit 88 displays these countermeasures on an improvement proposal screen 88D2 (FIG. 23) on the display unit 93. The user selects an improvement plan of either of the scale-in plan and the scale-down plan displayed on the improvement proposal screen 88D2 and presses the selection button 88D1 (FIG. 23). Then, the countermeasure is executed by the DB node 11, the storage cluster 23, the storage node 24, and/or the copy node 25 under the instruction of the management node 27.

(Configuration of Improvement Proposal Screen 88D2 (at the Time of Reducing Storage Node))

FIG. 23 is a diagram for depicting an example of a configuration of the improvement proposal screen 88D (at the time of reducing storage node) according to the second embodiment. The improvement proposal screen 88D2 depicted in FIG. 23 depicts a "scale-in plan" and a "scale-down plan" so that the user can select them.

On the improvement proposal screen 88D2 depicted in FIG. 23, the "scale-in plan" has displays of the current number of storage nodes 371 and the number of storage nodes after scale-in 372.

The current number of storage nodes 371 indicates the number of storage nodes 24 before scale-in decided in the processing of Step S38 (FIG. 22). The number of storage nodes after scale-in 372 indicates the number of storage nodes 24 after scale-in decided in the processing of Step S38.

In addition, on the improvement proposal screen 88D2 depicted in FIG. 23, the "scale-in plan" has displays of a volume ID 381, a compute ID 382, a migration permission 383, and a migration destination storage node ID 384.

The volume ID 381 indicates a list of identification information of volumes on the storage node 24. The compute ID 382 indicates identification information of the computing resource (the DB node 11 or the copy node 25) that accesses the volume identified by the volume ID 381. The migration permission 383 indicates whether the corresponding volume can be migrated to another storage node 24 in the volume migration plan created in Step S35 (FIG. 22). In the migration permission 383, "○" indicates that the migration is possible, and "-" indicates that the migration is impossible. The migration destination storage node ID 384 indicates identification information of the storage node 24 of the migration destination in the case where the corresponding volume can be migrated.

In addition, on the improvement proposal screen 88D2 depicted in FIG. 23, the "scale-down plan" has displays of a storage node ID 391, a current node size 392, and a node size after scale-down 393.

The storage node ID 391 is identification information of the storage node 24. The current node size 392 indicates the node size of the storage node 24 before the change to the node size at the time of scale-down decided in Step S42 (FIG. 22). In addition, the node size after scale-down 393 indicates the node size at the time of scale-down decided in Step S42.

It should be noted that the scale-down plan may include a proposal of scale-down of the other storage nodes 24 belonging to the storage cluster 23 including the storage node 24 having a surplus of resources.

Effect of Second Embodiment

In the second embodiment, the volume on the storage node 24 to be reduced among the plurality of storage nodes 24 is migrated to the storage node 24 not to be reduced among the plurality of storage nodes 24, and the scale-in plan for reducing the corresponding storage node 24 is created.

Therefore, according to the second embodiment, by appropriately reducing surplus resources with respect to the access load on the storage device 63 by scale-in, wasteful resource consumption can be eliminated and the usage charge of the cloud can be reduced.

In addition, in the second embodiment, the scale-down plan for scaling down the node size of the storage node 24 not to be reduced among the plurality of storage nodes 24 is created.

Therefore, according to the second embodiment, by appropriately reducing surplus resources with respect to the access load on the storage device 63 by scale-down, wasteful resource consumption can be eliminated and the usage charge of the cloud can be reduced.

In addition, in the second embodiment, the DB node 11, the copy node 25, the storage node 24, or the storage cluster 23 is instructed to execute any one of the countermeasures displayed on the display unit 93 in response to a user instruction. The countermeasures are the scale-out plan, the scale-up plan, the load reduction plan, the scale-in plan, and the scale-down plan.

Therefore, according to the second embodiment, it is possible to seamlessly execute the countermeasures, from the creation to the execution, for the performance deterioration cause specifying processing (FIG. 18), the improvement proposal processing (at the time of overload) (FIG. 18), and the improvement proposal processing (at the time of reducing storage node) (FIG. 22) by the GUI operation displayed on the display unit 93.

Although the embodiments according to the present disclosure have been described above in detail, the present disclosure is not limited to the above-described embodiments, and can be variously changed without departing from the gist thereof. For example, the above-described embodiments have been described in detail for the purpose of clearly describing the present invention, and are not necessarily limited to those having all the described configurations. In addition, it is also possible to add, delete, or replace some configurations of the above-described embodiments to/from/with other configurations.

In addition, some or all of the above-described configurations, function units, processing units, and the like may be realized by hardware by, for example, designing with an integrated circuit. In addition, each of the above-described configurations, functions, and the like may be realized by software such that the processor interprets and executes a program for realizing each function. Information such as programs, tables, and files that realize each function can be placed in a memory, a storage device such as an HDD or an SSD, and a recording medium such as an integrated circuit card (IC card), a secure digital card (SD card), or a digital versatile disc (DVD).

In addition, in each of the above-described drawings, the control lines and information lines considered to be necessary for explanation are depicted, and all the control lines and information lines in the implementation are not necessarily depicted. For example, almost all the configurations may be regarded to be actually connected to each other.

In addition, the arrangement form of each processing function and data described above is merely an example. The arrangement form of each processing function and data may be changed to an optimum arrangement form from the viewpoints of the performance, processing efficiency, communication efficiency, and the like of hardware and software.

What is claimed is:

1. A management apparatus of a storage system for managing an access load on a second storage that provides, to second servers, a second volume to which a first volume provided to first servers by a first storage is remotely copied, and a snapshot created from the second volume,
- the management apparatus having a processor and a memory,
- wherein the processor
- monitors a number of accesses to a storage device storing the second volume or throughput thereof, and
- in response to the number of accesses or the throughput exceeding a threshold,
- determines a first number of accesses to the storage device for each of the first servers on a basis of a first number of writes to and a first number of reads from the second volume for each of the first servers,
- determines a second number of accesses to the storage device for each of the second servers on a basis of a second number of writes to and a second number of reads from the second volume for each of the second servers,
- determines an increase rate of the first number of accesses for each of the first servers and an increase rate of the second number of accesses for each of the second servers,
- specifies the first servers and the second servers in which the increase rate exceeds a threshold,
- based at least on the increase rate exceeding the threshold, displays information related to one or more countermeasures on a display unit, and
- causes execution of at least one of the one or more countermeasures to suppress deterioration of processing performance resulting from the increase rate exceeding the threshold.

2. The management apparatus according to claim 1, wherein
- the processor
- determines the first number of accesses for each of the first servers on a basis of the first number of reads and the first number of writes for each of the first servers, number of a plurality of the storage devices for each data protection type, and an access amplification coefficient, and
- determines the second number of accesses for each of the second servers on a basis of the second number of reads and the second number of writes for each of the second servers, the number of the storage devices for each data protection type, and an access amplification coefficient.

3. The management apparatus according to claim 1, wherein
- the second storage is a storage cluster including a plurality of storage nodes,
- the processor,
- in response to the number of accesses or the throughput exceeding a threshold,
- creates volume groups including the second volume,
- determines a third number of accesses to the storage device for each of the volume groups,
- compares the third number of accesses with a threshold, and
- in response to the third number of accesses related to any of the volume groups exceeding the threshold,
- creates a countermeasure as one of the one or more countermeasures including a scale-out plan in which the second storage is scaled out to add a storage node, and the relevant volume group in which the third number of accesses exceeds the threshold is migrated to the relevant added storage node.

4. The management apparatus according to claim 3, wherein
- the processor
- causes the snapshot to be included in the volume group, and
- creates a countermeasure as one of the one or more countermeasures including the scale-out plan in which the volume group including the snapshot is migrated to the added storage node.

5. The management apparatus according to claim 3, wherein
- the processor
- creates a countermeasure as one of the one or more countermeasures including the scale-out plan in which the snapshot is excluded from the volume group,
- the volume group from which the snapshot is excluded is migrated to the added storage node,
- the snapshot is deleted, and
- the snapshot is newly created in the storage node in a migration destination where the volume group is migrated, on a basis of the second volume included in the relevant volume group.

6. The management apparatus according to claim 3, wherein
- the processor,
- in response to the number of accesses or the throughput exceeding a threshold,
- creates second volume groups including a volume on another storage node having a redundant configuration with the storage node having the storage device in which the number of accesses or the throughput exceeds the threshold,
- determines a fourth number of accesses to the storage device for each of the second volume groups, and
- compares the fourth number of accesses with a threshold, and
- in response to the fourth number of accesses related to any of the second volume groups exceeding the threshold,
- creates a countermeasure as one of the one or more countermeasures including the scale-out plan in which the second storage is scaled out to add a storage node and the relevant second volume group in which the fourth number of accesses exceeds the threshold is migrated to the relevant added storage node.

7. The management apparatus according to claim 3, wherein the processor, in response to the number of accesses or the throughput exceeding a threshold, creates a countermeasure as one of the one or more countermeasures for scaling up the storage node having the storage device in which the number of accesses or the throughput exceeds the threshold.

8. The management apparatus according to claim 3, wherein the processor, in response to the number of accesses or the throughput exceeding a threshold, creates a countermeasure as one of the one or more countermeasures including a server reduction plan for reducing the second servers in which the increase rate exceeds the threshold.

9. The management apparatus according to claim 1, wherein the processor creates a countermeasure as one of the one or more countermeasures including a scale-in plan in which the second volume on a storage node to be reduced among a plurality of storage nodes is migrated to a storage node not to be reduced among the plurality of storage nodes and the storage node to be reduced is reduced.

10. The management apparatus according to claim 9, wherein the processor creates a countermeasure as one of the one or more countermeasures including a scale-down plan for scaling down a node size of the storage node not to be reduced among the plurality of storage nodes.

11. The management apparatus according to claim 1, wherein the processor causes execution of the at least one of the one or more countermeasures by instructing at least one of the first servers, the second servers, the storage nodes, or the storage cluster to execute the at least one countermeasure of the one or more countermeasures displayed on the display unit in response to a user instruction.

12. A management method executed by a management apparatus of a storage system for managing an access load on a second storage that provides, to second servers, a second volume to which a first volume provided to first servers by a first storage is remotely copied, and a snapshot created from the second volume, the management apparatus having a processor and a memory, the management method comprising:

by the processor, monitoring a number of accesses to a storage device storing the second volume or throughput thereof, determining that the number of accesses or the throughput exceeds a threshold, and in response to determining that the number of accesses or the throughput exceeds the threshold, determining a first number of accesses to the storage device for each of the first servers on a basis of a first number of writes and a first number of reads to/from the second volume for each of the first servers, determining a second number of accesses to the storage device for each of the second servers on a basis of a second number of writes and a second number of reads to/from the second volume for each of the second servers, determining an increase rate of the first number of accesses for each of the first servers and an increase rate of the second number of accesses for each of the second servers, specifying the first servers and the second servers in which the increase rate exceeds the threshold, based at least on the increase rate exceeding the threshold, displaying information related to one or more countermeasures on a display unit, and causing execution of at least one of the one or more countermeasures to suppress deterioration of processing performance resulting from the increase rate exceeding the threshold.

* * * * *